(12) United States Patent
Wu

(10) Patent No.: US 7,051,235 B2
(45) Date of Patent: May 23, 2006

(54) CLOCK DISTRIBUTION ARCHITECTURE HAVING CLOCK AND POWER FAILURE PROTECTION

(75) Inventor: Chung-Hsiao R. Wu, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 566 days.

(21) Appl. No.: 10/229,225

(22) Filed: Aug. 27, 2002

(65) Prior Publication Data
US 2004/0044922 A1 Mar. 4, 2004

(51) Int. Cl.
*G06F 11/00* (2006.01)
(52) U.S. Cl. .......................... 714/20; 713/400
(58) Field of Classification Search .................. 714/20, 714/6, 3, 8, 27, 14; 713/400, 320, 323
See application file for complete search history.

(56) References Cited

U.S. PATENT DOCUMENTS

| 4,025,874 | A |   | 5/1977  | Abbey            |         |
|-----------|---|---|---------|------------------|---------|
| 4,282,493 | A |   | 8/1981  | Moreau           |         |
| 5,167,024 | A | * | 11/1992 | Smith et al.     | 713/322 |
| 5,546,591 | A | * | 8/1996  | Wurzburg et al.  | 713/322 |
| 5,648,964 | A |   | 7/1997  | Inagaki et al.   |         |
| 5,808,876 | A | * | 9/1998  | Mullenbach et al.| 361/788 |
| 5,919,265 | A | * | 7/1999  | Nishtala et al.  | 713/400 |
| 5,969,558 | A |   | 10/1999 | Abe              |         |
| 6,122,756 | A | * | 9/2000  | Baxter et al.    | 714/30  |
| 6,194,969 | B1 |   | 2/2001  | Doblar           |         |
| 6,378,080 | B1 | * | 4/2002  | Anjo et al.      | 713/500 |
| 6,614,862 | B1 | * | 9/2003  | Doblar           | 375/354 |
| 6,737,902 | B1 |   | 5/2004  | Tomsio et al.    |         |
| 6,757,350 | B1 |   | 6/2004  | Chesavage        |         |
| 6,768,640 | B1 | * | 7/2004  | Doblar et al.    | 361/695 |
| 6,775,784 | B1 | * | 8/2004  | Park             | 713/320 |
| 6,836,852 | B1 |   | 12/2004 | Wang et al.      |         |
| 2004/0001303 | A1 | * | 1/2004 | Doblar et al.   | 361/601 |
| 2004/0001311 | A1 | * | 1/2004 | Doblar et al.   | 361/687 |
| 2004/0013215 | A1 | * | 1/2004 | Doblar          | 375/354 |

OTHER PUBLICATIONS

Motorola, Inc., Semiconductor Technical Data, "Dynamic Switch PLL Clock Driver," Sep. 1997, pp. 1-6.

* cited by examiner

*Primary Examiner*—Nadeem Iqbal
(74) *Attorney, Agent, or Firm*—Meyertons Hood Kivlin Kowert & Goetzel, P.C.; B. Noël Kivlin; Erik A. Heter

(57) ABSTRACT

A clock distribution architecture having clock and power failure protection is disclosed. In one embodiment, a computer system includes a plurality of client boards and a plurality of switch boards, as well as having power distribution boards and clock boards (referred to herein as service processor boards). In one embodiment may include a clock board and a plurality of power distribution boards, while another embodiment may include a power distribution board and a plurality of clock boards. The clock board(s) may generate a global clock signal, which may be distributed to the switch boards and the power distribution board(s). The power distribution board(s) may distribute the global clock signal to the client boards. Clock redundancy may be provide through either having multiple clock boards or multiple power distribution boards.

30 Claims, 16 Drawing Sheets

CLOCK DISTRIBUTION ARCHITECTURE HAVING CLOCK AND POWER FAILURE PROTECTION

BACKGROUND OF THE INVENTION

1. Field of the Invention

This invention relates to electronic systems, and more particularly, to clock and power failure protection for ensuring reliability of electronic systems.

2. Description of the Related Art

High availability computer systems such as file servers typically require reliable power and clocking. Power and/or clock failures may result in system down time. In some systems, even a momentary interruption in power or clocking may result in a system crash. In order to prevent system down time, redundancy may be built into the power and/or clocking circuitry.

Redundancy for power distribution systems may include using multiple power sources to supply a computer system. Additional redundancy may be attained by using multiple boards for power distribution within the computer system. The boards may include detection circuitry, which may be configured to detect the presence of power from the other board. One of the boards may act as a primary power distribution board, while one or more additional boards may act as secondary power distribution boards. If the primary power source or the primary power distribution board fails, one of the secondary power distribution boards may take over the duties of supplying power.

Redundancy for clocking of a computer system may be provided in a similar manner, using multiple clock boards. Each of the clock boards may include detection circuitry for detecting the presence of a clock signal which is provided to the computer system. One clock board may act as a primary clock board, with one or more clock boards acting as secondary clock boards. If the primary clock board fails, one of the secondary clock boards may detect this failure and take over as the primary clock board.

Companies that design and build computers are under constant demand to provide more functionality. Similarly, there is a constant demand to keep power consumption low or within certain limits. Due to these conflicting demands, it has become increasingly difficult to provide the desired redundancy for many computer systems, including those requiring high-availability. Many computer systems for which protection is desired may be so complicated that straightforward design for redundancy may compromise the cost, the design efficiency, or both.

SUMMARY OF THE INVENTION

A clock distribution architecture having clock and power failure protection is disclosed. In one embodiment, a computer system includes a plurality of client boards and a plurality of switch boards, as well as having power distribution boards and clock boards (referred to herein as service processor boards). In one embodiment may include a clock board and a plurality of power distribution boards, while another embodiment may include a power distribution board and a plurality of clock boards. The clock board(s) may generate a global clock signal, which may be distributed to the switch boards and the power distribution board(s). The power distribution board(s) may distribute the global clock signal to the client boards. Clock redundancy may be provide through either having multiple clock boards or multiple power distribution boards.

BRIEF DESCRIPTION OF THE DRAWINGS

Other aspects of the invention will become apparent upon reading the following detailed description and upon reference to the accompanying drawings in which.

Figure 1:
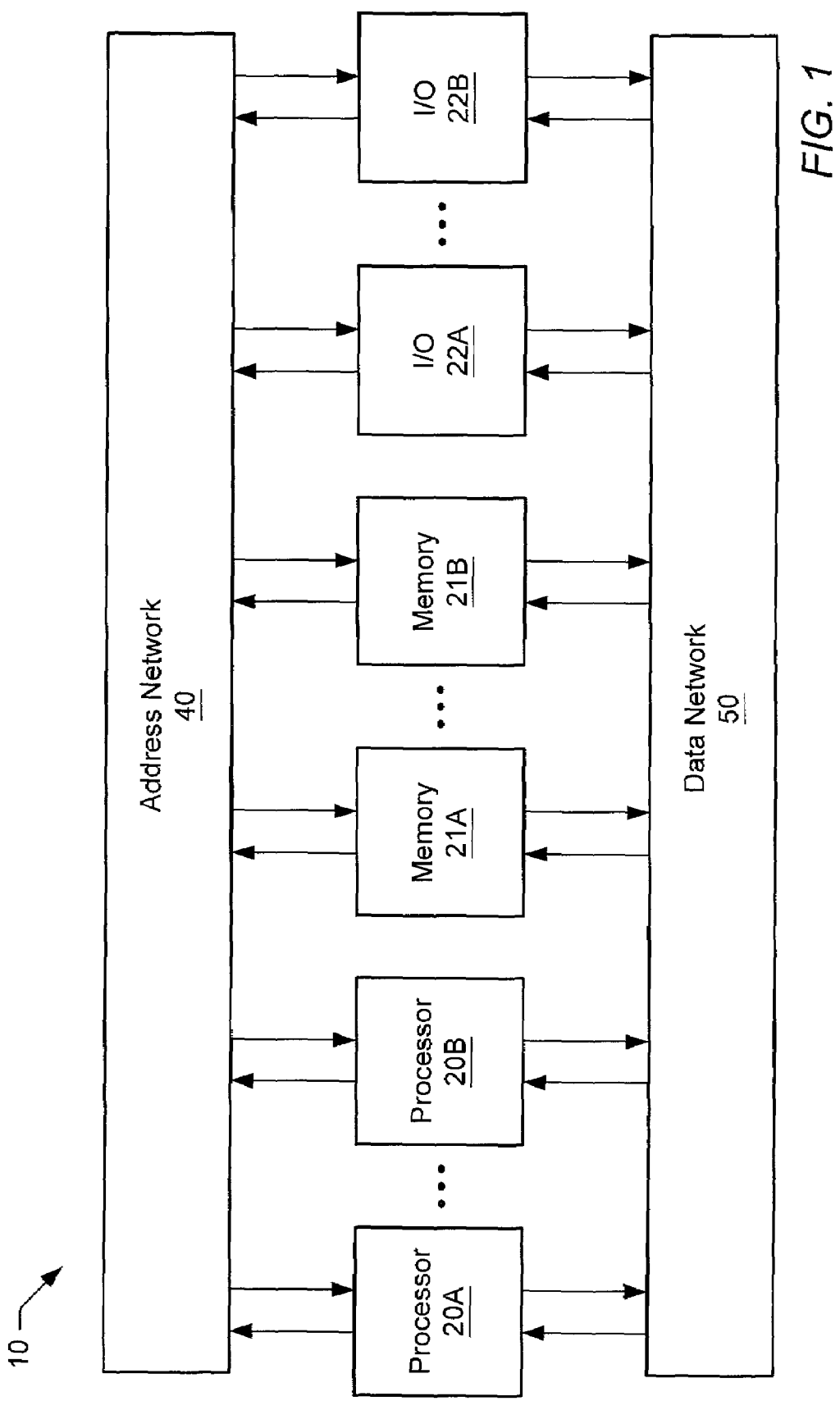
FIG. 1 is a block diagram of one embodiment of a computer system.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling with the spirit and scope of the present invention as defined by the appended claims.

DETAILED DESCRIPTION OF THE INVENTION

Turning now to FIG. 1, a block diagram of one embodiment of a computer system 10 is shown. Computer system 10 includes multiple client subsystems interconnected through an address network 40 and a data network 50. The embodiment of FIG. 1 may be considered a logical representation of computer system 10. The client subsystems include processor 20A and 20B, memory subsystems 21A and 21B and I/O subsystems 22A and 22B. It is noted that each of the subsystems may be referred to as a client device. It is noted that, although six client devices are shown in FIG. 1, embodiments of computer system 10 employing any number of client devices and different combinations of client device types are contemplated. Elements referred to herein with a particular reference number followed by a letter may be collectively referred to by the reference number alone.

For example, processor subsystems 20A-B may be collectively referred to as processor subsystems 20. In the present embodiment, computer system 10 is a single multiprocessor node operating in a stand-alone configuration. In other embodiments however, computer system 10 may be connected to other nodes.

Generally speaking, each of processor subsystems 20 and I/O subsystems 22 may access each of memory subsystems 21. Devices configured to perform accesses to memory subsystems 21 are referred to herein as "active" devices. Each client in FIG. 1 may be configured to convey address transactions on address network 40 and data transactions on data network 50 using split-transaction packets. Each processor subsystem 20 in the illustrated embodiment may include a processor (not shown in FIG. 1). Processor subsystems 20 may further include one or more instruction and data caches which may be configured in any of a variety of specific cache arrangements. For example, set-associative or direct-mapped configurations may be employed by the caches within processor subsystems 20.

Memory subsystems 21 are configured to store data and instruction code for use by processor subsystems 20 and I/O subsystems 22. Memory subsystems 21 preferably comprise dynamic random access memory (DRAM), although other types of memory may be used. In addition, the memory within memory subsystems 21 may be configured using dual in-line memory modules (DIMM). Each address in the address space of computer system 10 may be assigned to a particular memory subsystem, referred to as the home subsystem of the address.

I/O subsystem clients 22 may each be illustrative of a peripheral device such as, for example, an input-output bridge, a graphics device, a networking device, etc. In various embodiments, I/O subsystems 22 may each include a cache memory subsystem similar to those of processor subsystems 20 for caching data associated with addresses mapped within one of the memory subsystems.

In one embodiment, data network 50 is a point-to-point switched network. However, it is noted that in alternative embodiments other networks may be used. In a switched network, a particular client device communicates directly with a second client device via a dedicated point-to-point link that may be established through a switched interconnect mechanism. To communicate with a third client device, the particular client device utilizes a different link, as established by the switched interconnect, other than the one used to communicate with the second client device.

In the embodiment of FIG. 1, address network 40 may implement a broadcast network in which address transactions are conveyed to all client devices. Address network 30 may be embodied physically using a point-to-point, switched network configured to broadcast address transactions. Address network 40, as well as data network 50, may be implemented using a multi-stage switching hierarchy. In alternative embodiments, address network 40 may be implemented using a common bus structure. Address network 40 may be embodied in hardware that is separate from data network 50, or in hardware that is shared with data network 50.

Address network 40 accommodates communication between processing subsystems 20, memory subsystems 21, and I/O subsystems 22. Operations upon address network 40 are generally referred to as address transactions. When the destination of an address transaction is a storage location within a memory subsystem 21, the destination may be specified via an address conveyed with the transaction upon address network 40. Subsequently, data corresponding to the transaction on the address network 40 may be conveyed upon data network 50.

Figure 2:
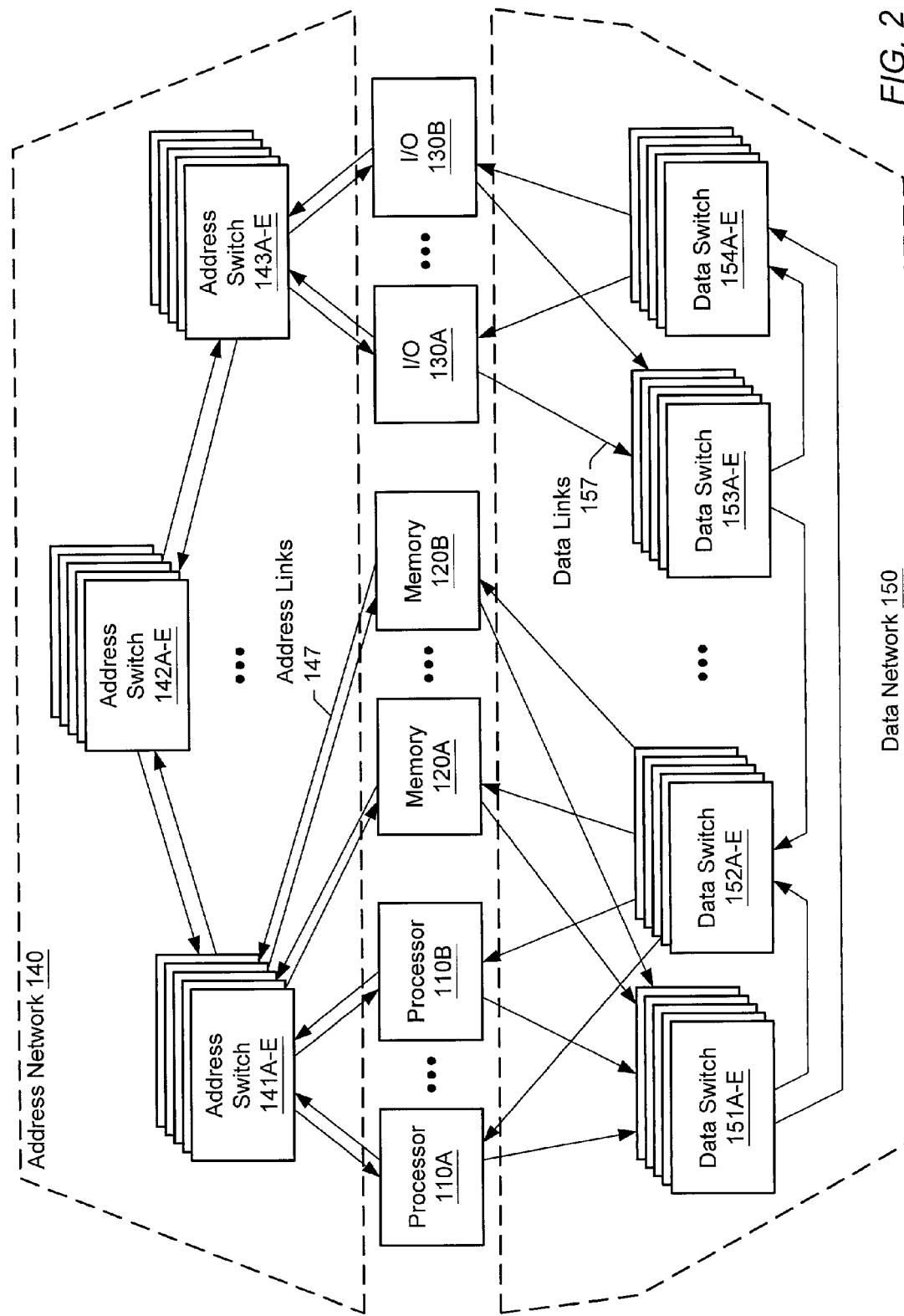
FIG. 2 is an architectural diagram of one embodiment of a computer system.

As will be described further below in conjunction with the description of FIG. 2, to increase system reliability and availability, address network 40 and data network 50 may be implemented in multiple pieces. Each piece of address network 40 may convey a portion of the address packet body and a portion of an associated error code and each piece of data network 50 may convey a portion of the data packet body and a portion of an associated error code. Further, one or more of the pieces of address network 40 and one or more of the pieces of data network 50 may convey only the parity portion of the error codes of the other pieces. Each piece may be referred to as a "slice." Referring to FIG. 2, a diagram of one embodiment of a computer system 100 is shown. Similar to the embodiment of FIG. 1, computer system 100 of FIG. 2 includes multiple clients interconnected through an address network 140 and a data network 150. The embodiment of FIG. 2 may be thought of as one particular configuration of a computer system such as computer system 10 of FIG. 1. In FIG. 2, address network 140 and data network 150 are two-stage switched networks including a plurality of address switches and a plurality of data switches. The clients include processor clients 110A–B, memory subsystem clients 120A–B and I/O subsystem clients 130A–B. It is noted that although only two clients from each category are shown in the configuration of the illustrated embodiment, other embodiments may include different numbers of clients in this type of configuration. It is also noted that in other embodiments, any number of client subsystems and corresponding configurations may be used. Computer system 100 may operate in much the same way as the embodiment described above in conjunction with FIG. 1. It is noted that many physical configurations may be implemented to scale computer system 100. For example, systems containing fewer numbers of clients are contemplated. Such systems may use single stage switch networks (not shown). It is further contemplated that systems containing only a few clients may need no address switches and processor subsystem address links may be connected directly to memory subsystems.

In FIG. 2, address network 140 includes three groups of address switches, labeled 141A–E, 142A–E and 143A–E. As used herein and described in greater detail in conjunction with the description of FIG. 8, an address switch may be implemented as an integrated circuit containing many individual switches and circuits. Each address switch group includes five switches which represent five address slices. To illustrate, address switch 141A may correspond to slice 0, address switch 141B may correspond to slice 1, and so forth. Address switch 141E may represent parity of slices 0–3. As will be described in greater detail below in conjunction with FIG. 3A through FIG. 3C, slices 0–3 correspond to address bits and error detecting/correcting code bits of an address packet and slice 4 of may correspond to parity of each of slices 0–3. Likewise, data network 150 includes four groups of data switches, labeled 151A–E, 152A–E, 153A–E and 154A–E. As used herein and described in greater detail in conjunction with the description of FIG. 8, a data switch may be implemented as an integrated circuit containing many individual switches and circuits. Each data switch group includes five switches which represent five data slices. To illustrate, data switch 151A may correspond to slice 0, data switch 151B may correspond to slice 1, and so forth. Data switch 151E may represent parity of slices 0–3. As will be described in greater detail below in conjunction with FIG.

4A through FIG. 4D, slices 0–3 correspond to data bits and error detecting/correcting code bits of a data packet and slice 4 may correspond to parity of each of slices 0–3. In one embodiment, each parity slice is the exclusive-OR (XOR) of the respective slices 0–3. It is noted that although five slices are used in the illustrated embodiment, it is contemplated that other embodiments may include other numbers of slices.

Address links 147 are used to interconnect clients to address switches and address switches to other address switches. Similarly, data links 157 are used to interconnect clients to data switches and data switches to other data switches. Address links 147 and data links 157 may be coupled to an address interface (not shown) and a data interface (not shown) which may be included on each client. As described above, the address interface may be uni-directional, point-to-point and source-synchronous and may include an address-in port and an address-out port. Each address-in port of a client may be either a five or a ten-link port depending on whether the port is configured to be a narrow or a wide port, respectively. Each link may have 12 signals. The data interface may also be uni-directional, point-to-point and source-synchronous and may include a data-in port and a data-out port. Each data port may include 5 links of 12 signals each. It is noted that other embodiments are contemplated which include other numbers of links and other numbers of signals on a given interface.

Figure 3:
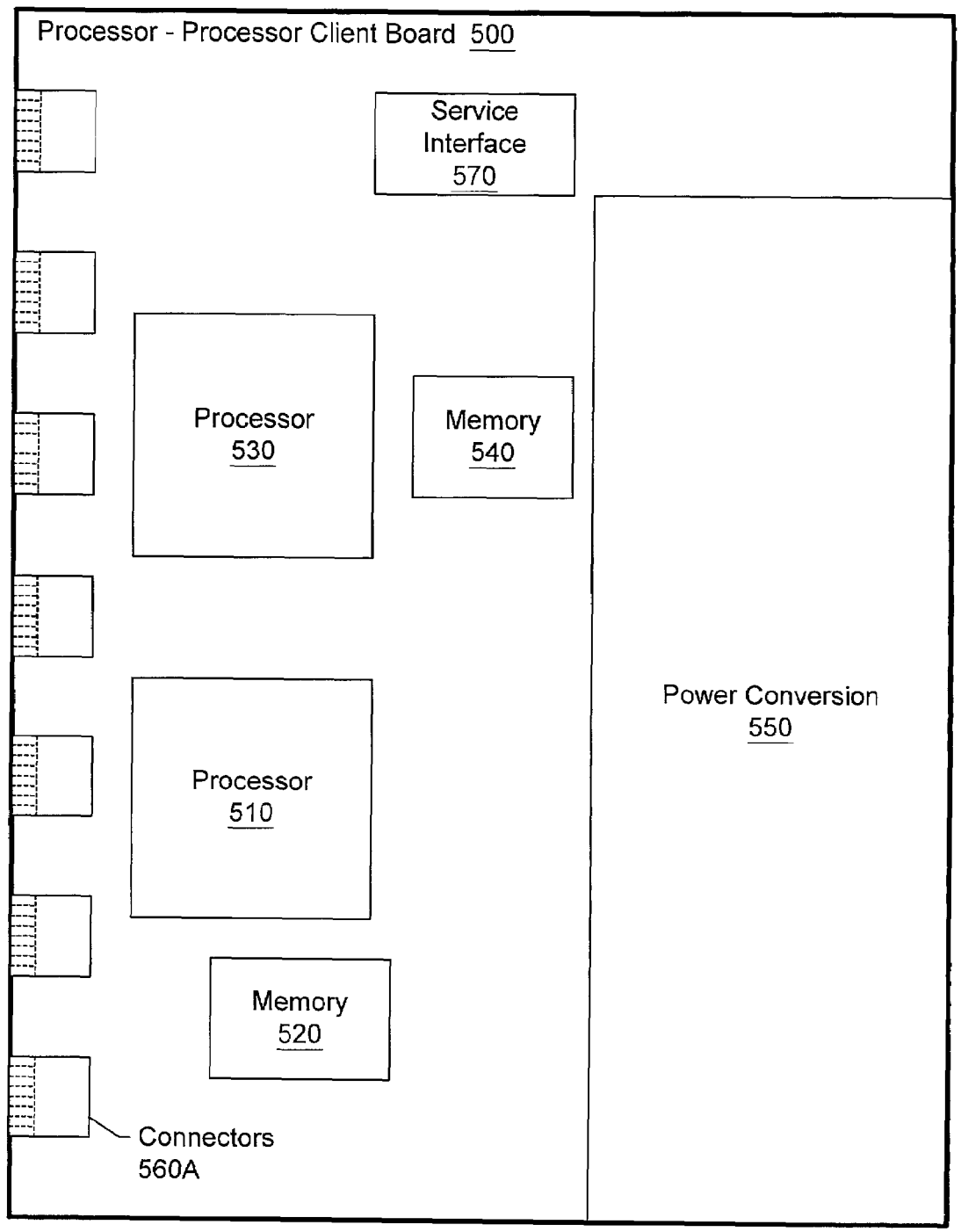
FIG. 3 is a diagram of one embodiment of a dual client processor board of a computer system.

Turning to FIG. 3, a diagram of one embodiment of a dual client processor board 500 of a computer system is shown. The dual client processor board 500 is a circuit board which includes two processors, such as the processors of the computer systems illustrated in FIG. 1 and FIG. 2. Each processor on dual client processor board 500 is an independent processor client. The first processor client includes a processor 510 and a memory 520. The second processor client also includes a processor 530 and a memory 540. In addition, dual processor client board 500 includes a power conversion block 550 and a service interface 560. Dual client processor board 500 connects to the rest of the computer system via a plurality of connectors 570.

Processor 510 and processor 530 are each illustrative of, for example, an UltraSPARC™ microprocessor such as an UltraSPARC™ 5 microprocessor by Sun Microsystems, Inc. It is contemplated however, that in other embodiments, other processors may be used.

Memory 520 may be used as a cache memory for processor 510 as described above in conjunction with the description of FIG. 1. Memory 520 may be implemented in static random access memory (SRAM). Likewise, memory 540 may be used as a cache memory for processor 530 and may be implemented in static random access memory (SRAM).

Power conversion block 550 may be a DC to DC converter configured to provide a DC operating voltage for components on the dual client processor board 500. In one embodiment, power conversion block 550 may convert 48VDC to 1VDC. As will be described in greater detail below, redundant 48V power distribution boards may supply 48V to each client board in the computer system. Power conversion block 550, receives the redundant 48V and converts it to a single 1VDC supply. It is contemplated that in other embodiments, power conversion block may provide other suitable voltages as necessary. Further, in an alternative embodiment, power conversion block may provide redundant 1VDC supplies.

Service interface 570 is a service module configured to provide a service interface from each client, which in the illustrated embodiment are processors, to a service processor board (not shown in FIG. 3) via a special service bus (not shown). In one embodiment, service interface 570 may be a custom integrated circuit configured to translate communications between the service bus protocol and the protocol used by processor 510 and 530. As will be described in greater detail below, the service interface may allow the service processor to configure processor 510 and 530 into system domains and to diagnose failures on dual client processor board 500.

Figure 5:
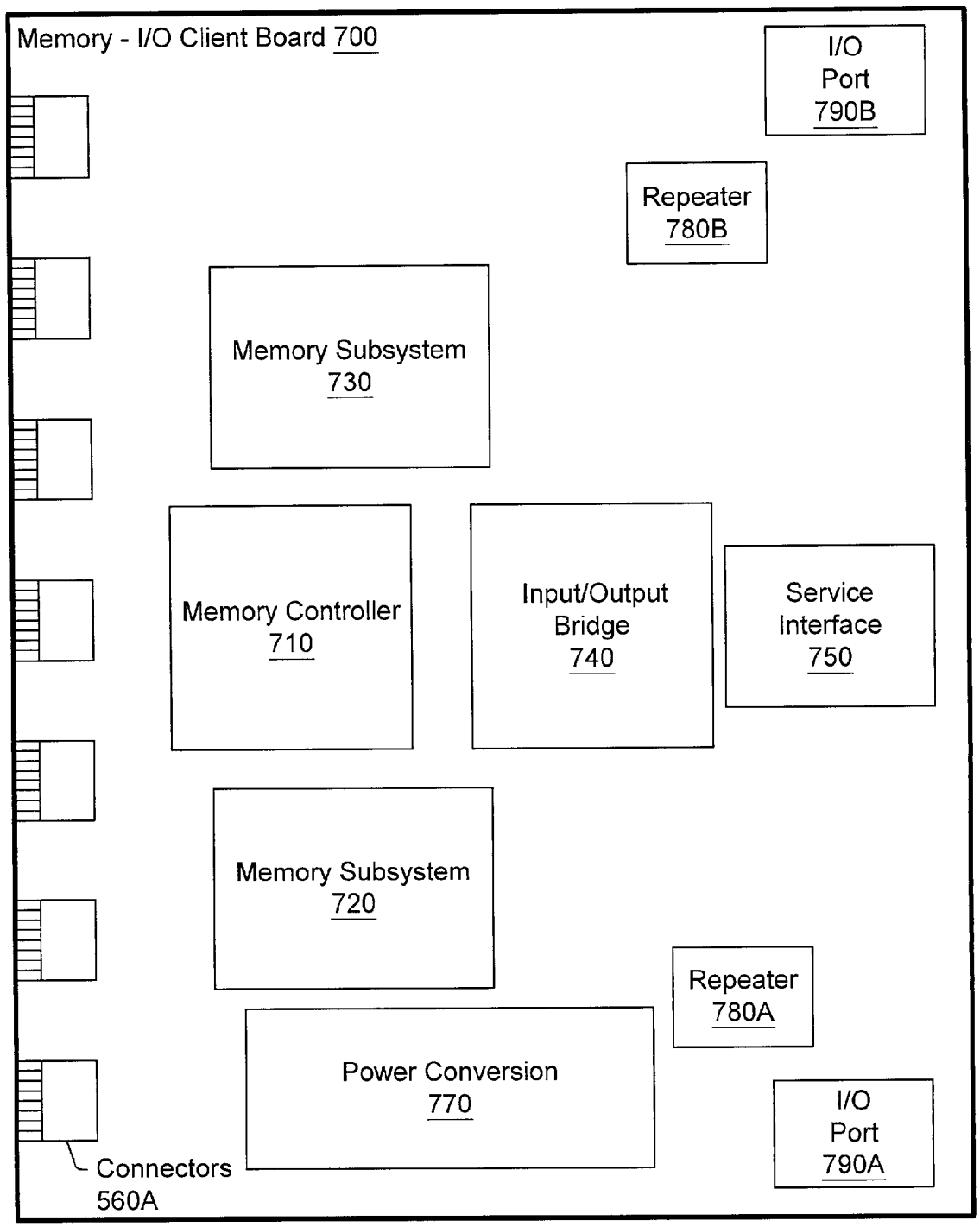
FIG. 5 is a diagram of one embodiment of a dual client memory—I/O board of a computer system.

Connectors 560A are configured to convey power, ground and signal information between dual client processor board 500 and switch and power boards (not shown in FIG. 5). Each of connectors 560A may be physically arranged along one edge and mounted to one side of dual client processor board 500. As will be described in further detail below, each of connectors 560A may be detachably mated to a corresponding connector on the switch and power boards.

Figure 4:
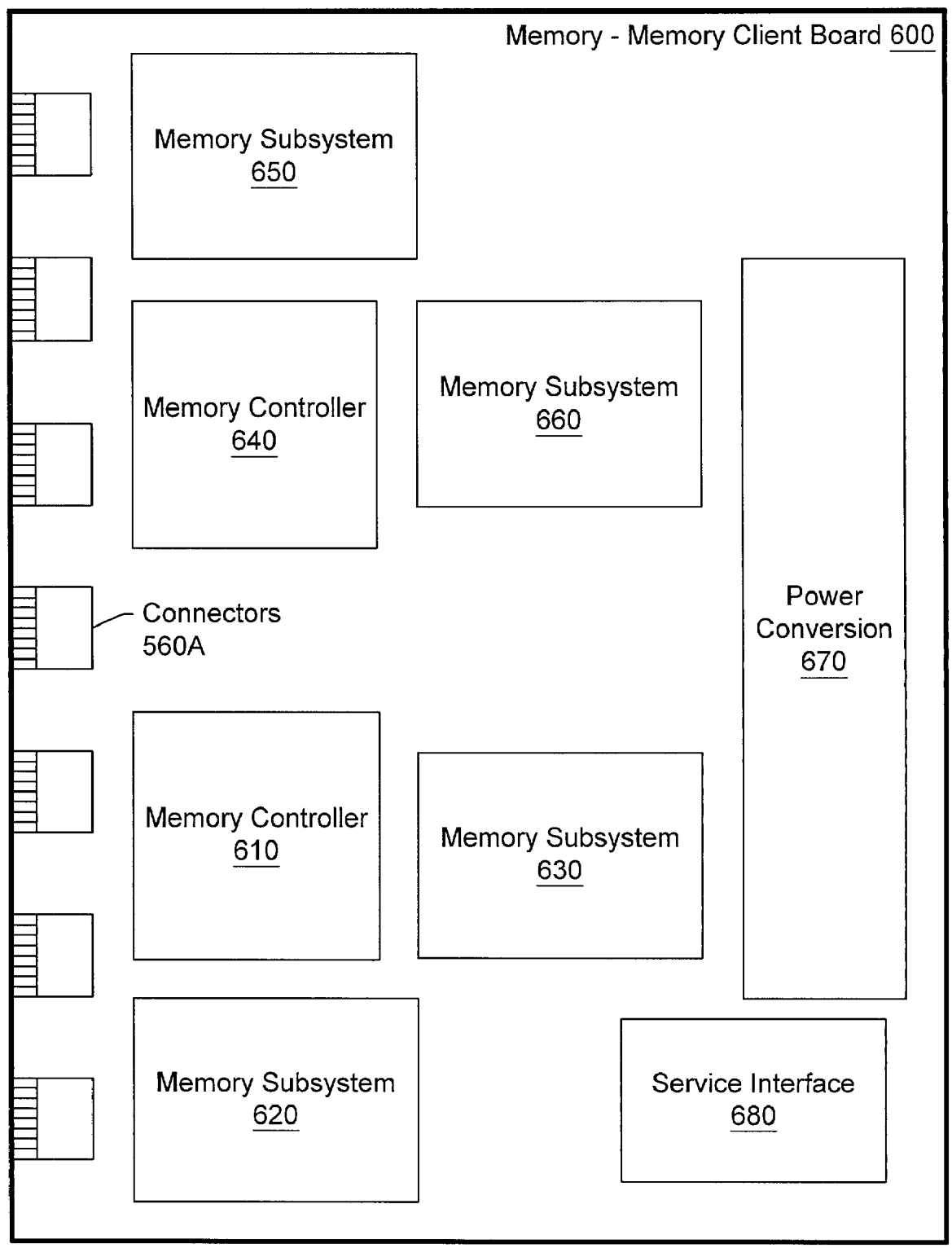
FIG. 4 is a diagram of one embodiment of a dual client memory board of a computer system.

Turning to FIG. 4, a diagram of one embodiment of a dual client memory board 600 is shown. Dual client memory board 600 is a circuit board including two memory clients, such as the memory clients of the computer systems illustrated in FIG. 1 and FIG. 2. Each memory client on dual client memory board 500 is an independent memory client. The first memory client includes a memory controller 610 and two independent memory subsystems 620 and 630. The second memory client includes a memory controller 640 and two additional independent memory subsystems 650 and 660. Dual client memory board 600 also includes a power conversion block 670 and a service interface 680. Further, dual client memory board 600 connects to the rest of the computer system via a plurality of connectors 560A. It is noted that connectors 560A are similar to connectors 560A of FIG. 3 and thus labeled identically.

Each memory controller may be configured to control memory transactions involving their respective memory subsystems. In one embodiment, memory subsystem 620 and memory subsystem 630 may each be implemented using DIMMs which each include a plurality of DRAM chips. The DRAM chips on each DIMM may be grouped into multiple banks. The DIMMs may be implemented to include error detection/error correction capability. The error detection/error correction capability may include using redundant DIMMs to store parity information. Each memory controller may also be configured to control interleaving of data across the memory banks of each of the memory subsystems.

Figure 6:
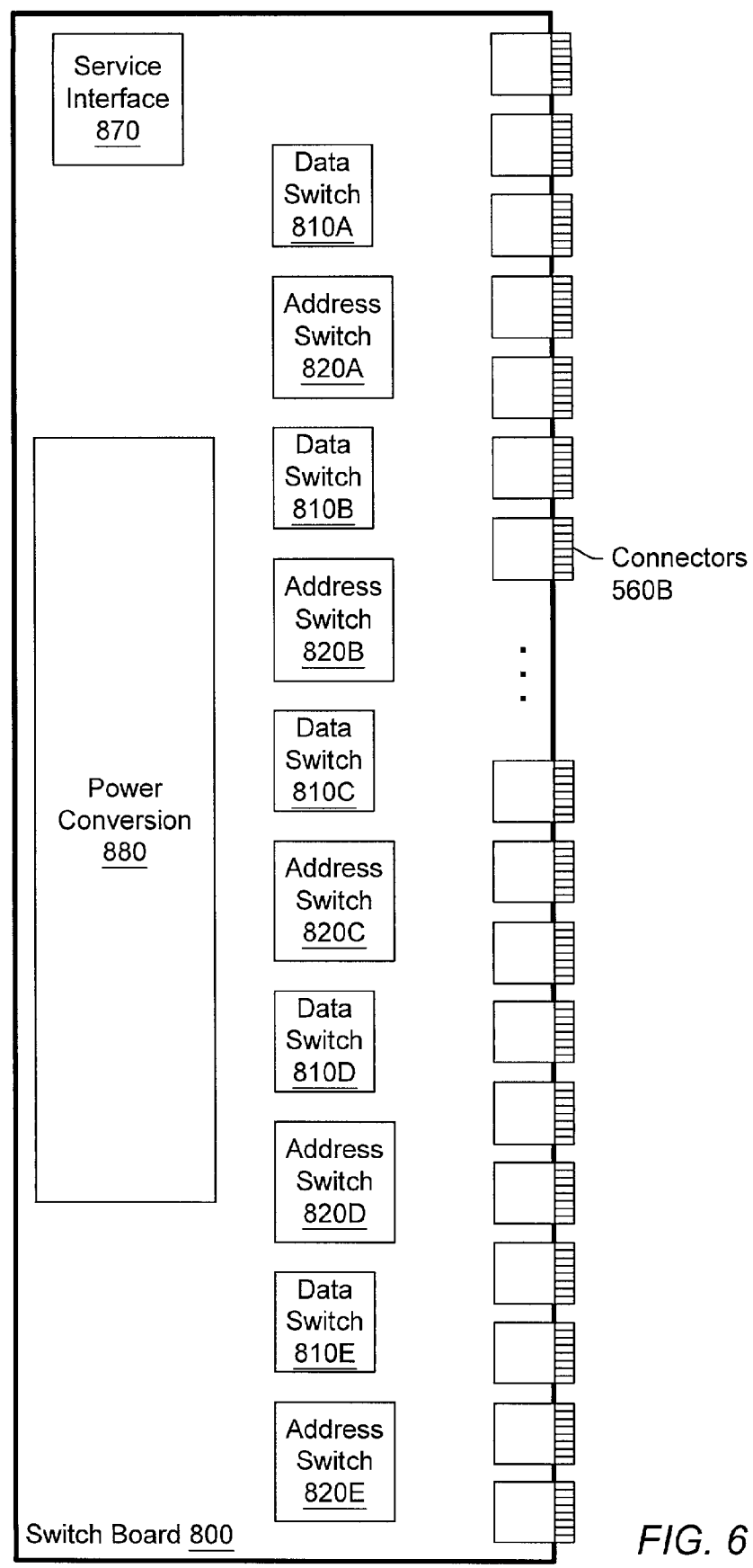
FIG. 6 is a diagram of one embodiment of a switch board of a computer system.

Similar to the description of power conversion block 550 of FIG. 3, power conversion block 670 of FIG. 6 may be a DC to DC converter configured to provide a DC operating voltage for components on the dual client memory board 600. In one embodiment, power conversion block 670 may convert 48VDC to 1VDC.

Service interface 680 of FIG. 4 is a service module configured to provide an interface from each memory controller to a service processor (not shown in FIG. 4) via a special service bus (not shown). Similar to the service interface described in FIG. 3, service interface 680 may be a custom integrated circuit configured to translate communications between the service bus protocol and the protocol used by memory controller 610 and 640.

Connectors 560A of FIG. 4 are configured to convey power, ground and signal information between dual client memory board 600 and switch and power boards (not shown in FIG. 6). Each of connectors 6560A may be physically arranged along one edge and mounted to one side of dual client memory board 600. As will be described in further detail below, each of connectors 560A may be detachably mated to a corresponding connector on the switch and power boards.

Referring to FIG. 5, a diagram of one embodiment of a dual client memory—I/O board 700 is shown. The dual client memory—I/O board 700 is a circuit board including a memory client and an I/O bridge client, such as the memory clients and I/O clients of the computer systems illustrated in FIG. 1 and FIG. 2. The memory client includes a memory controller 710 and two memory subsystems 720 and 730. The I/O bridge client includes an I/O bridge 740 and two I/O ports, 790A and 790B. Dual client memory—I/O board 700 also includes a power conversion block 770 and a service interface 750. Further, dual client memory—I/O board 700 includes a plurality of connectors 760.

The memory client of FIG. 5, including memory controller 710 and memory subsystems 720 and 730, operates in a manner that is similar to each of the memory clients described above in conjunction with the description of FIG. 4.

I/O bridge 740 is configured to provide an interface between memory controller and 710 devices that may be connected externally to the computer node. I/O ports 790A and 790B may provide the physical I/O ports for I/O bridge 740. In one embodiment, I/O bridge 740 may translate Infiniband™ transactions into transactions suitable for use by memory controller 710 and vice versa. I/O ports 790AB may be InfiniBand™ ports and may provide 12 parallel Infiniband™ channels per port. Further, I/O ports 790AB may transmit and receive InfiniBand™ transactions via fiber optic cable.

Power conversion block 770 and service interface 750 operate in a manner that is similar to the power conversion blocks and service interfaces described above in conjunction with the descriptions of FIG. 3 and FIG. 4.

Similar to the connectors described above in FIG. 3 and FIG. 4, connectors 560A of FIG. 5 are configured to convey power, ground and signal information between dual client memory—I/O board 700 and switch and power boards (not shown in FIG. 5). Each of connectors 560A may be physically arranged along one edge and mounted to one side of dual client memory board 700. Each of connectors 560A may be detachably mated to a corresponding connector on the switch and power boards. It is noted that although seven connectors are shown on the circuit boards of FIG. 5 through FIG. 7, it is contemplated that in other embodiments, other numbers of connectors may be used.

It is noted that although the various client boards above are described as being dual client boards, it is contemplated that in other embodiments client boards having other numbers of clients may be used. For example, a board having a single client may be used or alternatively, a multi-client board having three or more clients may be used.

Turning to FIG. 6, a diagram of one embodiment of a switch board is shown. Switch board 800 is a circuit board including a plurality of data switches 810A through 810E and a plurality of address switches 820A through 820E such as the address and data switches described in conjunction with the description of FIG. 2. Switch board 800 also includes a power conversion block 880 and a service interface 870. Further, Switch board 800 includes a plurality of connectors 860.

Data switches 810A–E may be configured to provide routing of data packets within the computer system as described above in FIG. 2. Address switches 820A–E may be configured to route address packets as described above in FIG. 2. Hereafter, data switches 810A–E and address switches 820A–E may be referred to collectively as data switches 810 and address switches 820, respectively.

In one embodiment, data switches 810 and address switches 820 may each be a custom integrated circuit capable of being programmed as an address switch or a data switch. When the custom integrated circuit is programmed as an address switch, it may accommodate different address-in and address-out port configurations. Likewise, when the custom integrated circuit is programmed as a data switch, it may accommodate different data-in and data-out port configurations. For example, the integrated circuit may be programmed to have multiple address ports or data ports. In the illustrated embodiment, there are five data switches and five address switches. If used with up to four other switch boards, this particular implementation is intended to provide address and data switching for up to 40 clients in a computer system. However, it is contemplated that other embodiments may use other numbers of address and data switches and other numbers of switch boards to accommodate other numbers of clients. In an alternative embodiment, the custom integrated switch may be specific to either a data switch or an address switch.

Power conversion block 880 and service interface 870 operate in a manner similar to the power conversion blocks and service interfaces described above in conjunction with the descriptions of FIG. 3, FIG. 4 and FIG. 5.

Connectors 560B are configured to convey signal information between the various dual client boards and to convey power and ground from the service processor boards (not shown in FIG. 6). Each of connectors 560B may be physically arranged along one edge and mounted to one side of switch board 800. Each of connectors 560B may be detachably mated to a corresponding connector (560A) on each of the dual client boards and the service processor boards. It is noted that the number of connectors in the present embodiment may be dependent upon the size of switch board 800 which may be dependent upon the number of client boards that the computer system is designed to use. Thus, it is contemplated that any suitable number of connectors may be used.

Figure 7:
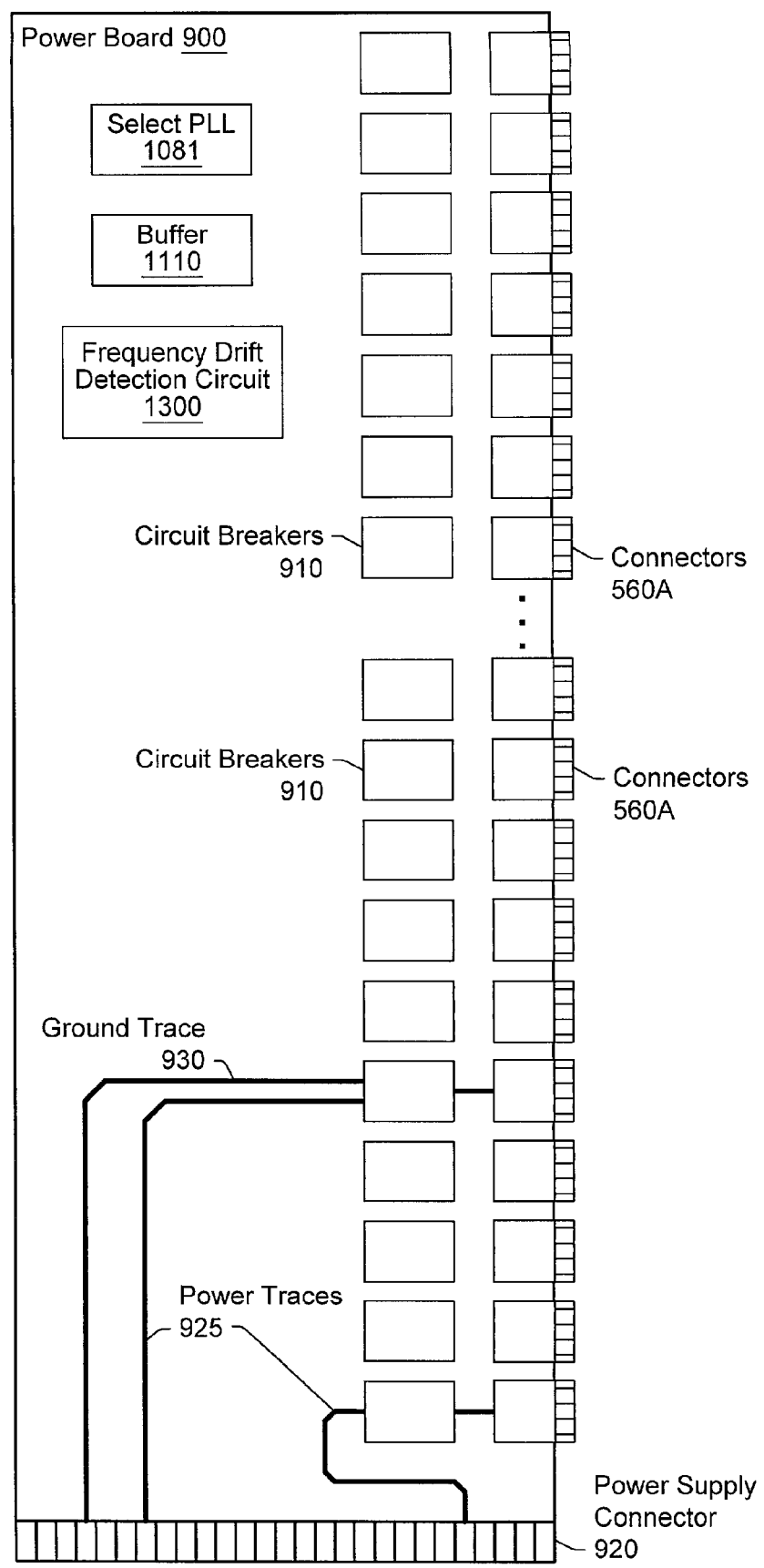
FIG. 7 is a diagram of one embodiment of a power distribution board of a computer system.

Turning to FIG. 7, a diagram of one embodiment of a power distribution board is shown. Power board 900 is a circuit board including a plurality of connectors 960 and a plurality of circuit breakers 910. Power board 900 also includes a power supply connector 920. Power board 900 also includes a plurality of power traces 925 and ground traces 930 which may interconnect circuit breakers 910 to power supply connector 920. In one embodiment, Power board 900 may be configured to distribute 48V power and ground from a system power supply (not shown in FIG. 7) to the client boards and service processor boards (not shown in FIG. 7). Other embodiments distributing power of different voltages are possible and contemplated. It is noted that although power and ground traces are used to convey power and ground between power supply connector 920 and circuit breakers 910, it is contemplated that other embodiments may include multiple layers and may use power and ground buses or power and ground planes or a combination of traces, buses and planes to convey power and ground. It is further noted that power board 900 may also include additional functionality as necessary.

Power supply connector 920 may be positioned along one edge of power board 900 such that when positioned within a computer system, power supply connector 920 may mate with a corresponding connector within a power supply. In the illustrated embodiment, power supply connector 920 is located on the bottom edge of power board 900. However, it is contemplated that in other embodiments, the bottom edge may be a side edge or a top edge depending on the orientation of the computer system as a whole.

Each of circuit breakers 910 may be configured to interrupt the flow of current through a given one of connectors 560B to prevent excessive current from flowing. As will be described in greater detail below, this feature may allow client and service boards to be connected to and disconnected from power board 900 while power is on. In addition, power board 900 may be removed or installed while power is on. Circuit breakers 910 may be configured to disconnect or 'trip' during a short circuit or over-current condition. Further, circuit breakers 910 may be reset, once they are tripped, thereby allowing the circuit to be re-energized after any problem has been corrected.

Connectors 560B are configured to convey power and ground to the various dual client boards and to the service processor boards (not shown in FIG. 7). Each of connectors 560B may be physically arranged along one edge and mounted to one side of power board 900. When power board 900 is installed, each of connectors 560B may be detachably mated to a corresponding connector (560A) on the dual client boards and the service processor boards. It is noted that the number of connectors in the present embodiment may be dependent upon the size of power board 900 which may be dependent upon the number of client boards that the computer system is designed to use. Thus it is contemplated that any suitable number of connectors may be used. Power board 900 may also include clock circuitry for distributing a global clock signal to each of the client boards. In the embodiment shown, power board 900 includes select PLL 1081, buffer 1110, and frequency drift detection circuit (FDDC) 1300. Select PLL 1081 may be configured to receive a clock signal from a clock board and to provide the clock signal to buffer 1110. Buffer 1110 may be configured to distribute the clock signal to each of the client boards that may be coupled to power board 900. FDDC 1300 may be configured to monitor the phase difference between the clock signal and a feedback clock signal, and may inhibit the clock signal from distributed from the buffer should the phase difference exceed a predetermined limit. The clock distribution functions of power board 900 will be discussed in further detail below.

Figure 8A:
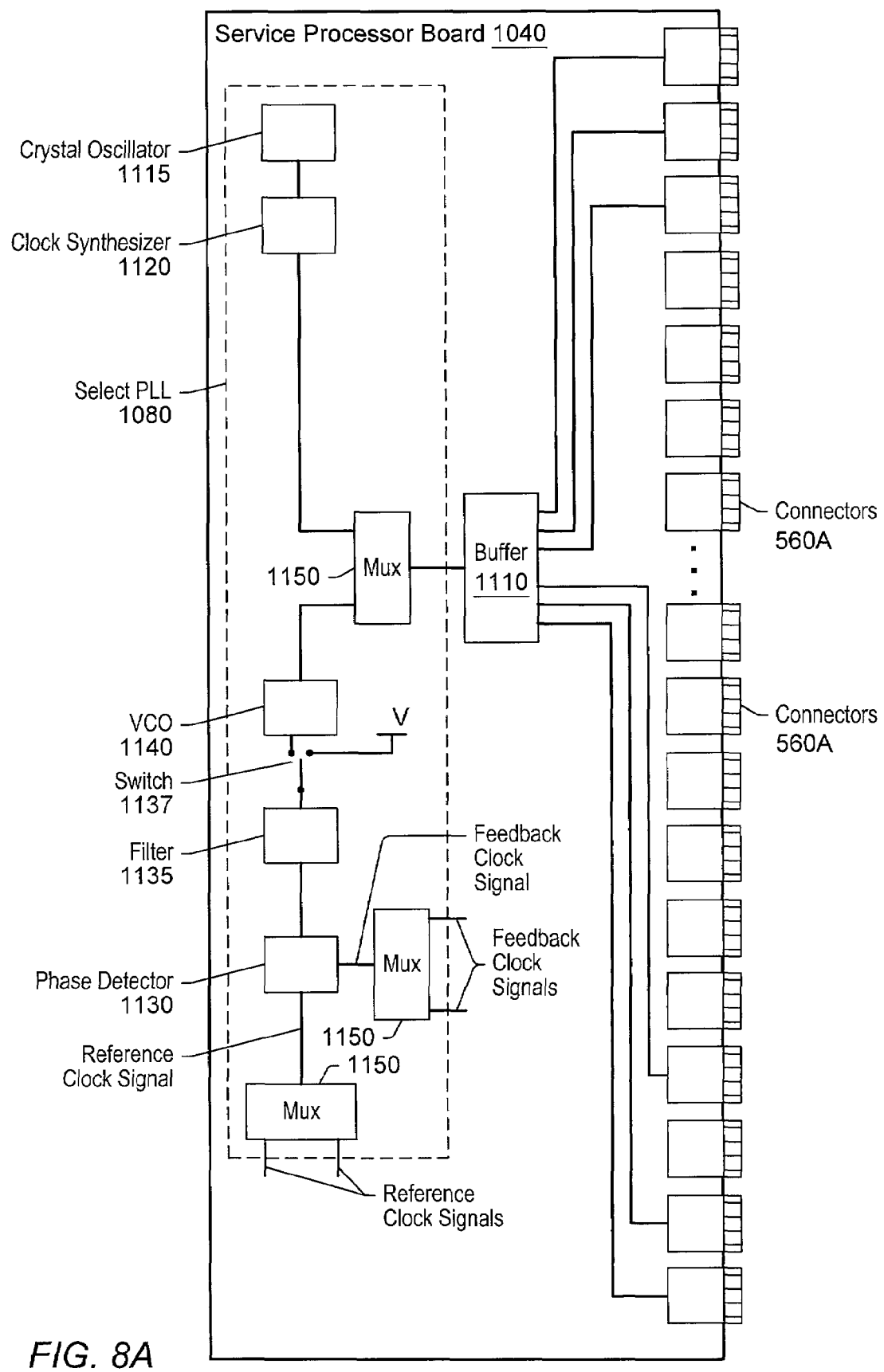
FIG. 8A is a diagram of one embodiment of a service processor board having clock distribution functions.

Turning now to FIG. 8A, a diagram of one embodiment of a service processor board having clock distribution functions is shown. Service processor board 1040 may be alternately referred to as a clock board due to the various clock generation and distribution functions it may be provide. The term 'service processor board' is used herein for purposes of consistency.

Service processor board (SPB) 1040 may include a plurality of connectors 560A, which may be identical to the connectors 560A features on the various embodiments of the client boards discussed above. Connectors 560A may be configured for coupling to connectors 560B described in conjunction with power board 900 and switch board 800. Thus, connectors 560A may allow for the coupling of SPB 1040 to each of the power boards 900 and switch boards 800 that may be present in the computer system.

SPB 1040 may provide clock generation and distribution functions. In the embodiment shown, SPB 1040 may include select PLL 1080, which may be an expanded version of the select PLL 1081 which may be present on power board 800. Select PLL 1080 may include a multiplexer 1150 which may provide one of two possible clock signals to buffer 1110. One clock signal may be provided by clock synthesizer 1120, while the other clock signal may be provided by VCO (voltage controlled oscillator) 1140. Buffer 1110 may then distribute the clock signal to each of the switch boards 800 and power boards 900 coupled to SPB 1040 via connectors 560A.

It is noted that each of the printed circuit boards described above in FIG. 3 through FIG. 8A may include multiple layers and include signal traces as well as signal planes. Further, it is noted that the functionality associated with the various components of the printed circuit boards of FIG. 3 through FIG. 8A may be embodied in one or more integrated circuit chips which may be mounted to the printed circuit boards.

Figure 8B:
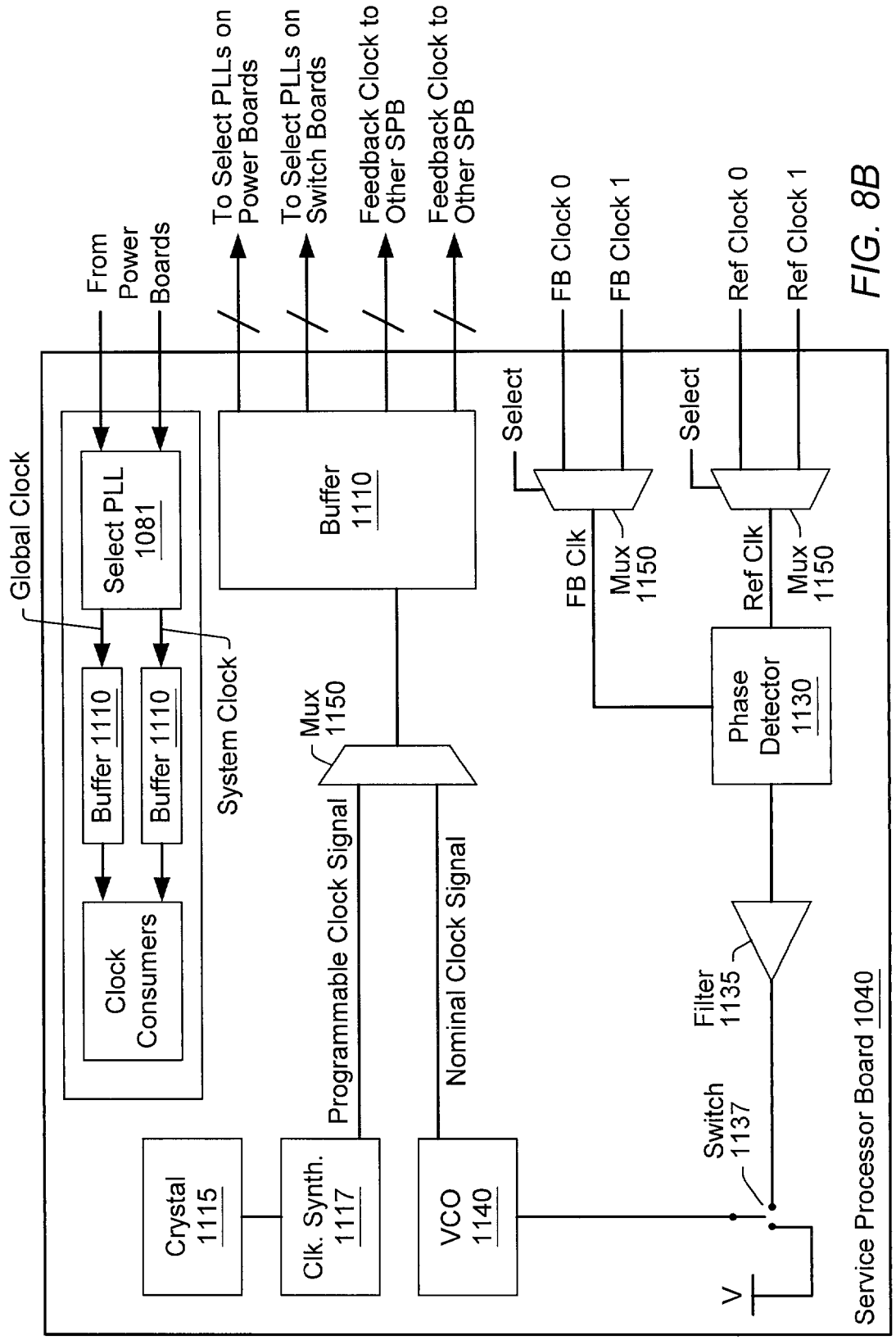
FIG. 8B is a block diagram of one embodiment of a service processor board having clock distribution functions.

FIG. 8B is a block diagram of one embodiment of a service processor board having clock distribution functions. In the embodiment shown, SPB 1040 includes crystal oscillator 1115, which is configured to generate a clock signal. The clock signal generated by crystal oscillator 1115 may be received by clock synthesizer 1117. Clock synthesizer 1117 may provide shaping functions for the received clock signal. Such shaping functions may include amplitude adjustment and duty cycle adjustment. In some embodiments, clock synthesizer 1117 may include an internal phase locked loop which may allow the generation of a clock signal with a frequency different than the clock signal generated by crystal oscillator 1115. In general, clock synthesizer 1117 may be programmed to output a clock signal of a predetermined frequency, amplitude, and duty cycle. The clock signal output by clock synthesizer 1 117 will be referred to herein as the programmable clock signal. The programmable clock signal may be received as an input to multiplexer 1150. The programmable clock signal may be used primarily for frequency margining tests and/or for system startup, and is not typically used during normal operations. The programmable clock signal may also be used for system debug.

A clock signal referred to herein as the nominal clock signal may be received at the other input to multiplexer 1150. The nominal clock signal may be provided by VCO 1140. In the embodiment shown, VCO 1140 may receive a control signal from either filter 1135 or from a voltage source V, depending upon the position of switch 1137. In one mode of operation, switch 1137 may be positioned such that VCO 1140 receives a control signal from filter 1135. Filter 1135 may be a low-pass filter, and may receive its input from phase detector 1130.

Phase detector 1130 may be configured to generate a control signal based on a phase difference between a reference clock signal and a feedback clock signal. In the embodiment shown, the reference and feedback clock signals may be received via a pair of multiplexers 1150. These multiplexers 1150 may select the clock signals to be used as reference and feedback clock signals. In the embodiment shown, the FB clock 0 (feedback clock 0) may be the global clock signal provided by SPB 1040 passed through a first power distribution board, while FB clock 1 may be the same global clock signal passed through a second power distribution board. As will be explained in further detail below, a power distribution board (such as power board 900 of FIG. 7) may be used to distribute the global clock signal a client boards in the computer system. Thus, the power distribution boards may also be used to provide the global clock signal as a feedback signal to the SPB 1040 from which it originates. The reference clock signal may also be provided through a multiplexer 1150 from either a first or a second power distribution board. In one embodiment, the reference clock signal may be generated by a source external to SPB 1040 (e.g. it may be generated by another SPB or other clock source), or may be provided through a second power distribution board (which is not distributing a global clock signal). The use of reference and feedback clock signals, a phase detector, and a VCO may provide a PLL function for the generation of the nominal clock signal.

SPB 1040 may be configured to distribute a global clock signal, which may be provided to each board within the computer system. The global clock signal may be derived from the nominal clock signal (as the programmable clock signal is not typically used during normal operations), and may be received by buffer 1110. The global clock signal may then be distributed by buffer 1110 to the other boards in computer system 10. In the embodiment shown, buffer 1110 may distribute the global clock signal to select PLLs in power boards 900 and switch boards 800 to which it is physically coupled. Power boards 900 may in turn distribute the global clock signal to various client boards 500, 600, or 700 (as previously described) which may be present in the system. Power boards 900 may also feed the global clock signal back the SPB 1040 from which it originated to be used as a feedback clock signal in a PLL. Furthermore, if another SPB 1040 is present in computer system 10, it may also receive the global clock signal (as a reference clock) from that SPB via a power board 900.

Through the generation of the nominal clock signal by the VCO 1140, SPB 1040 may provide clock redundancy, which may in turn provide additional reliability to computer system 10. SPB 1040 may be configured to provide the nominal clock signal as the global clock signal, and may further be configured to switch reposition switch 1137 in the event of a clock failure. For example, VCO 1140 may be receiving a voltage signal from filter 1135 during normal operation. If a clock failure occurs, switch 1137 may be automatically repositioned such that VCO 1140 receives a voltage signal from the voltage node shown in the drawing. Thus, SPB 1140 may be able to continue to provide a global clock signal even in the event of a failure of one of the input clock signals (FB clocks or Ref Clocks in the drawing) or any of the circuitry between the clock input and VCO 1140 (Mux's 1150, PD 1130, or filter 1135).

SPB 1040 may include functions other than clock generation and distribution. As shown in the drawing, SPB 1040 may be include a select PLL 1081 which may be coupled to receive one or more clock signals from a power board 900. It should be noted that select PLL 1081 may differ from select PLL 1080 in that select PLL 1081 may lack a crystal oscillator and/or a clock synthesizer. Other differences may also be present, although both types of select PLLs may provide an output clock signal. The output clock signals from select PLL 1081 may be forwarded to one or more buffers 1110. Buffers 1110 may then distribute the clock signals to clock consumers, which may be virtually any type of clock-synchronous circuitry.

In the embodiment shown, select PLL 1081 provides two output clock signals, a global clock signal and a system clock signal. The global clock signal is the same clock signal that is generated by SPB 1040 and distributed to the computer system. The system clock signal may be a clock signal of a different frequency than the global clock signal. Select PLL 1081 may include frequency multiplication or division functions, and may therefore generate a clock signal having a greater or lesser frequency than the global clock signal.

Figure 9:
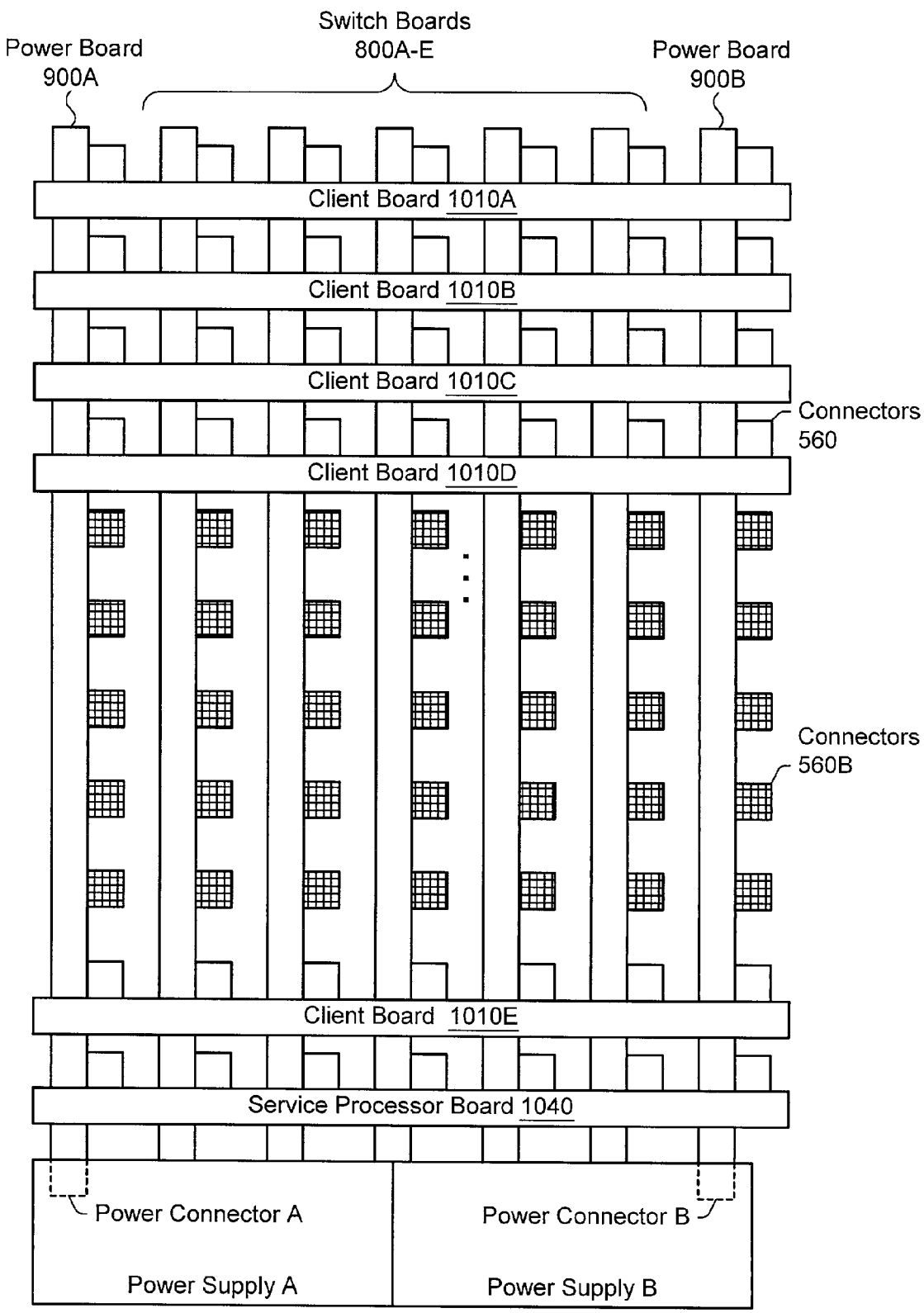
FIG. 9 is a diagram illustrating the rear view of one embodiment of the computer system of FIG. 1.
Figure 10A:
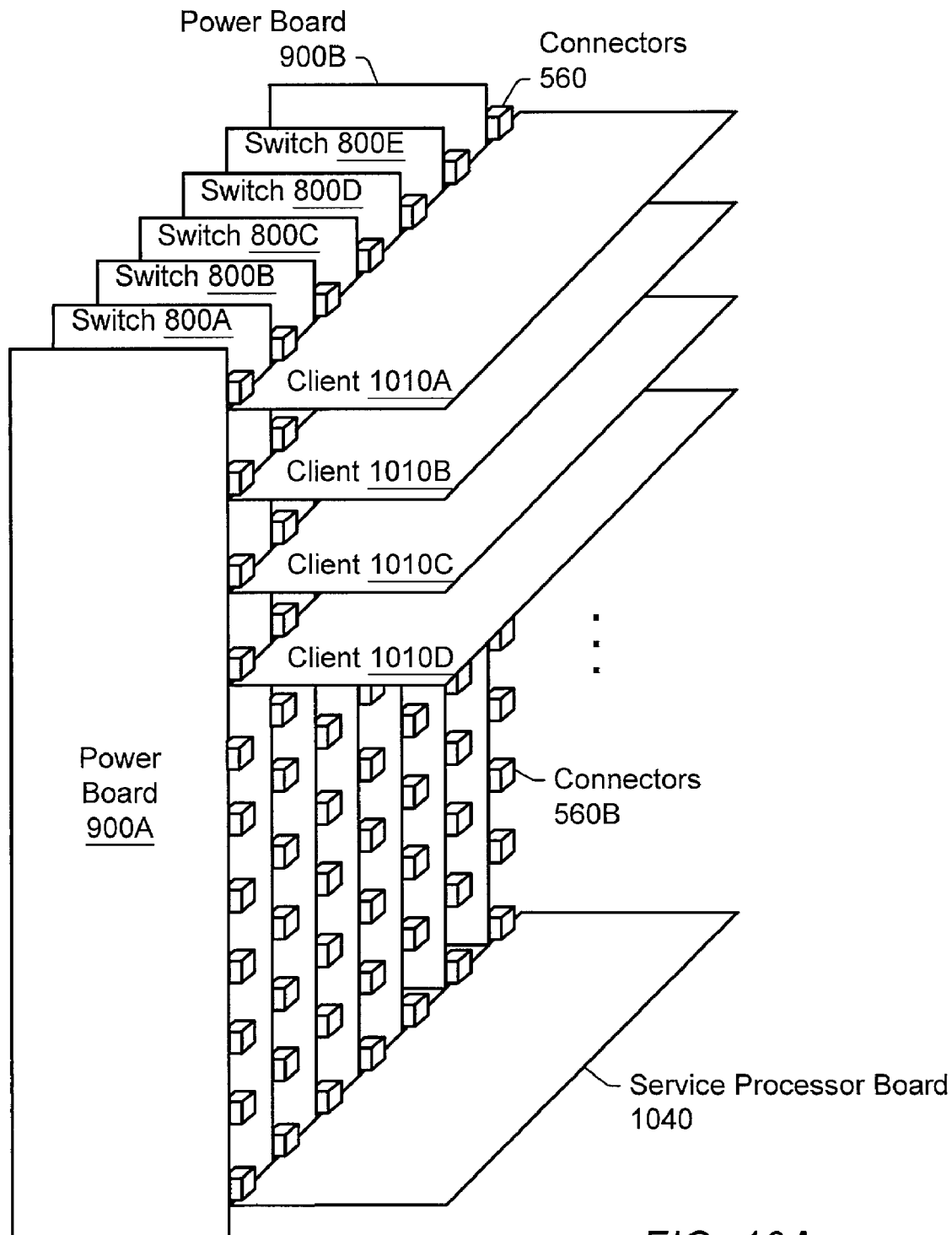
FIG. 10A is a perspective view diagram of one embodiment of the computer system of FIG. 1.
Figure 10B:
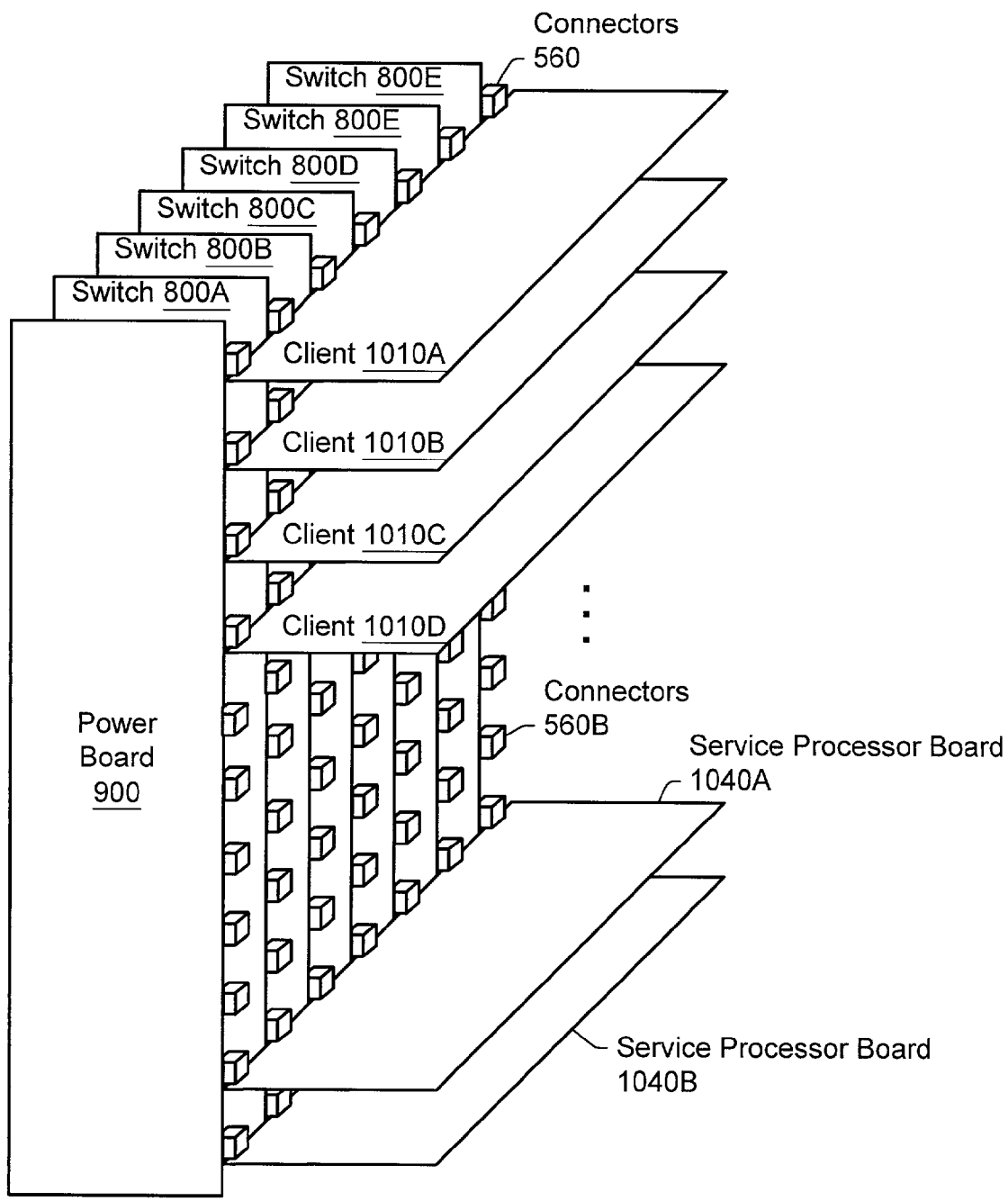
FIG. 10B is a perspective view diagram of another embodiment of the computer system of FIG. 1.
Figure 11:
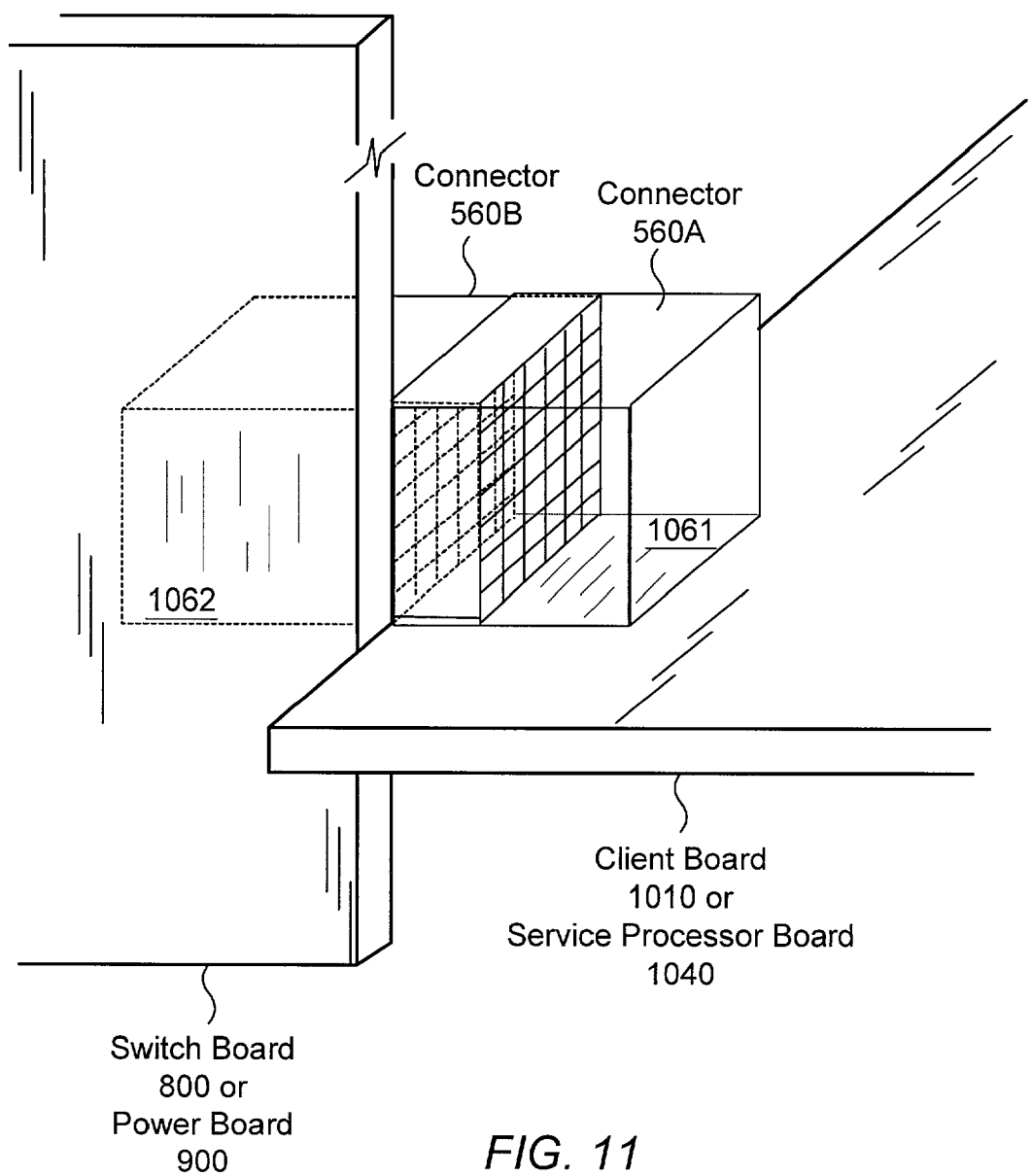
FIG. 11 is an exploded view diagram of one embodiment of a board connector and the orientation of two mated boards.

FIG. 9 through FIG. 11 illustrate different views of one embodiment of computer system 10 of FIG. 1. In FIG. 9, the rear view is shown. In FIG. 10A, a perspective view is shown, and in FIG. 10C an exploded view of the orientation of two mated boards is shown. Circuit components that correspond to those shown in FIG. 1–FIG. 8B are numbered identically for clarity and simplicity.

Turning now to FIG. 9 a diagram illustrating the rear view of one embodiment of computer system 10 of FIG. 1 is shown. FIG. 9 illustrates the physical positioning of the various circuit boards described above. As noted above, the arrangement of the various circuit boards may provide a centerplaneless computer system design. Computer system 10 includes five switch boards labeled 800A–E, two power boards labeled 900A and 900B, four client boards labeled 1010A–D and two service processor boards labeled 1040A–B. Computer system 10 also includes two power supplies: A and B. In addition, connectors 560A of FIG. 3–FIG. 5 and connectors 560B of FIG. 8–9 are shown collectively as connectors 560 when mated together.

It is noted that although only four client boards 1010, two power boards 900 and five switch boards 800 are shown, other embodiments are contemplated which may use other numbers of these boards. In particular it should be noted that in some systems the number of service processor boards or power distribution boards may be limited. For example, in one embodiment, computer system 10 may include two or more power boards, but only one service processor board. In another embodiment, computer system 10 may include two or more service processor boards but only one power board. Often times, straightforward design for redundancy may compromise design objectives for cost and system complexity. Limiting the number of power boards or clock boards may reduce these problems. Redundancy may be achieved by other methods, as will be explained in further detail below.

Power boards 900A–B and switch boards 800A–E are shown in the vertical plane. Switch boards 800A–E are located between power boards 900A–B. Switch boards 800A–E and power boards 900A–B are also shown substantially parallel to one another and forming an array of boards. Client boards 1010A–D and service processor boards 1040A–B are shown in the horizontal plane. The vertical boards are substantially orthogonal with respect to the horizontal boards may form a matrix of rows and columns when viewed from the front or the rear. Client boards 1010A–D and service processor boards 1040A–B are also shown substantially parallel to one another and also form an array of boards. The two arrays of boards are substantially perpendicular to each other. As described above in conjunction with the descriptions of FIG. 3 through FIG. 8A, each circuit board has a series of connectors (e.g. 560A and 560B) that convey power, ground and signals between boards and are used to detachably mate the two arrays of boards together. It is contemplated that in other embodiments, the entire system may be re-oriented such that the terms vertical and horizontal may not describe the same boards. However, the relationship between and among boards may be the same.

Power supply A and power supply B of FIG. 9 may be configured to provide redundant 48V power to the computer system, although embodiment providing power at other voltage levels are possible and contemplated. Power supply A provides 48V and ground to power board 900A via power connector A and power supply B provides 48V and ground to power board 900B via power connector B. Each of power supplies A and B includes an AC power cord for connection to an independent AC source. Each of power supplies A and B may convert AC to 48VDC.

As described above, power boards 900A–B are each configured to distribute 48VDC to client boards 1010A–D and to service processor boards 1040A–B. Service processor boards 1040A–B may be configured to redundantly distribute the 48VDC, A and B, to each of switch boards 800A–E. This power distribution scheme allows both the vertical and horizontal boards to be redundantly powered. If there is a failure of any part of the power distribution system, the computer system may continue to operate normally. Further, the failed power component may be removed and replaced during system operation. Thus, the power distribution scheme in the illustrated embodiment is intended to prevent any single point of failure within the power distribution system from causing a catastrophic shut down or system crash. It is noted that in alternative embodiments, it is contemplated that client boards 1010A–D may be used to distribute 48VDC, A and B to each of switch boards 800A–E.

In addition, any component in the computer system (e.g. a power board 900, a power supply, service processor board 1040, a switch board 800 and a client board 1010) may be removed and replaced while the computer system continues to operate. This feature is sometimes referred to as "hot swapping" a component. Thus, the physical implementation illustrated in FIGS. 9 to 11 is intended to provide hot swappable capability to any system component.

Further, circuit breakers 910 of FIG. 7 may trip if current faults are detected. For example, a faulty component, pins and connections within connectors 560 damaged during insertion of two boards, may each draw excessive current. If unprotected, excessive currents may burn system components, short out a given power supply and cause a catastrophic system shutdown.

As described above and further illustrated in the perspective view of FIG. 10A, the physical configuration of the system may provide independent maintenance access to each system board in the computer system such that any system board may be removed and replaced without removing other system boards. This may be in contrast to a computer system which uses a common centerplane, which may not be removed independently of any other system boards.

The computer system shown in FIG. 10A includes a plurality of switch boards 800 and a plurality client boards 1010 (which may be any type of client board as discussed above). The embodiment shown also include two power boards 900 and one SPB 1040. The dual power boards 900 may provide power redundancy in the event of a failure of one of their respective power supplies, or the power board itself. Any clock redundancy present may be provided by the features of SPB 1040 as discussed above in reference to FIGS. 8A and 8B. SPB 1040 may also be used to distribute power received from power boards 900 to switch boards 800.

In contrast, the embodiment shown in FIG. 10B may include only a single power board 900 and two SPB's, 1040A and 1040B. The dual SPBs 1040A and 1040B may provide extra clock redundancy. A first SPB (e.g. SPB 1040A) may distribute the global clock signal to the switch boards 800 and the power board 900 (which in turn may distribute the global clock signal to the client boards 1010). If the first SPB fails, the second SPB (e.g. SPB 1040B) may assume the function of distributing the global clock signal. In addition, both SPB 1040A and 1040B may provide the board-level clock redundancy as discussed above.

It should also be noted that system including multiple power boards 900 and multiple SPBs 1040 are possible and contemplated. Such embodiments may provide additional redundancy for both the functions of power distribution and clock distribution.

In addition to providing redundant power distribution to switch boards 800A–E, service processor boards 1040A–B may be configured to be redundant system controllers each capable of independently configuring system resources. Service processor boards 1040A–B may also be configured to provide test and diagnostic functions to diagnose system component failures through the service interface circuits located on each of client boards 1010A–D and switch boards 800A–E. The service processor boards 1040A–B may also be used to partition the computer system into different domains. Additionally, service processor boards 1040A–B may be used to initialize system components, such as clients, and to reconfigure the system when circuit boards are removed and/or installed.

It is noted that, power boards 900A–B are located in the two outermost positions or 'slots' to the left and right of switch boards 800A–E. It is noted that the components on the various client boards may be positioned to minimize lead lengths between switch boards 800A–E and each client board. In addition, positioning switch boards 800A–E side-by-side with no intervening boards of another type may also minimize lead lengths. Further, the positioning of power boards 900A–B and switch boards as shown may provide symmetry in the line lengths which may provide more uniform clock domain distribution among the various boards. However in alternative embodiments it is contemplated that power boards 900A–B and switch boards 800A–E may be positioned in any vertical slot as necessary.

Referring now to the exploded view diagram of FIG. 11, two system boards are shown detachably mated together by connector 560. As described above connector 560 includes two portions: connector 560A and connector 560B. Connector 560B may include multiple internal connections and may be mounted to one surface 1062 of the vertical circuit board using any suitable mounting technique. The internal connections of connector 560B make contact with signal traces or other connections (not shown) on the vertical circuit board. In the illustrated embodiment, the vertical circuit board is shown as either a switch board 800 or a power board 900. Connector 560A may also include multiple signal connections and may be mounted to one surface 1061 of the horizontal circuit board using any suitable mounting technique. The internal connections of connector 560B make contact with signal traces or other connections (not shown) on the horizontal circuit board. In the illustrated embodiment, the horizontal board is shown as either a client board 1010 or a service processor board 1040. As shown, connector 560A and connector 560B are mated together such that the boards are positioned in a substantially orthogonal orientation with respect to each other. Further, for each of the multiple signal connections within connectors 560A and 560B, a corresponding ground return path (not shown) which is proximate to each signal connection may be provided.

Figure 12A:
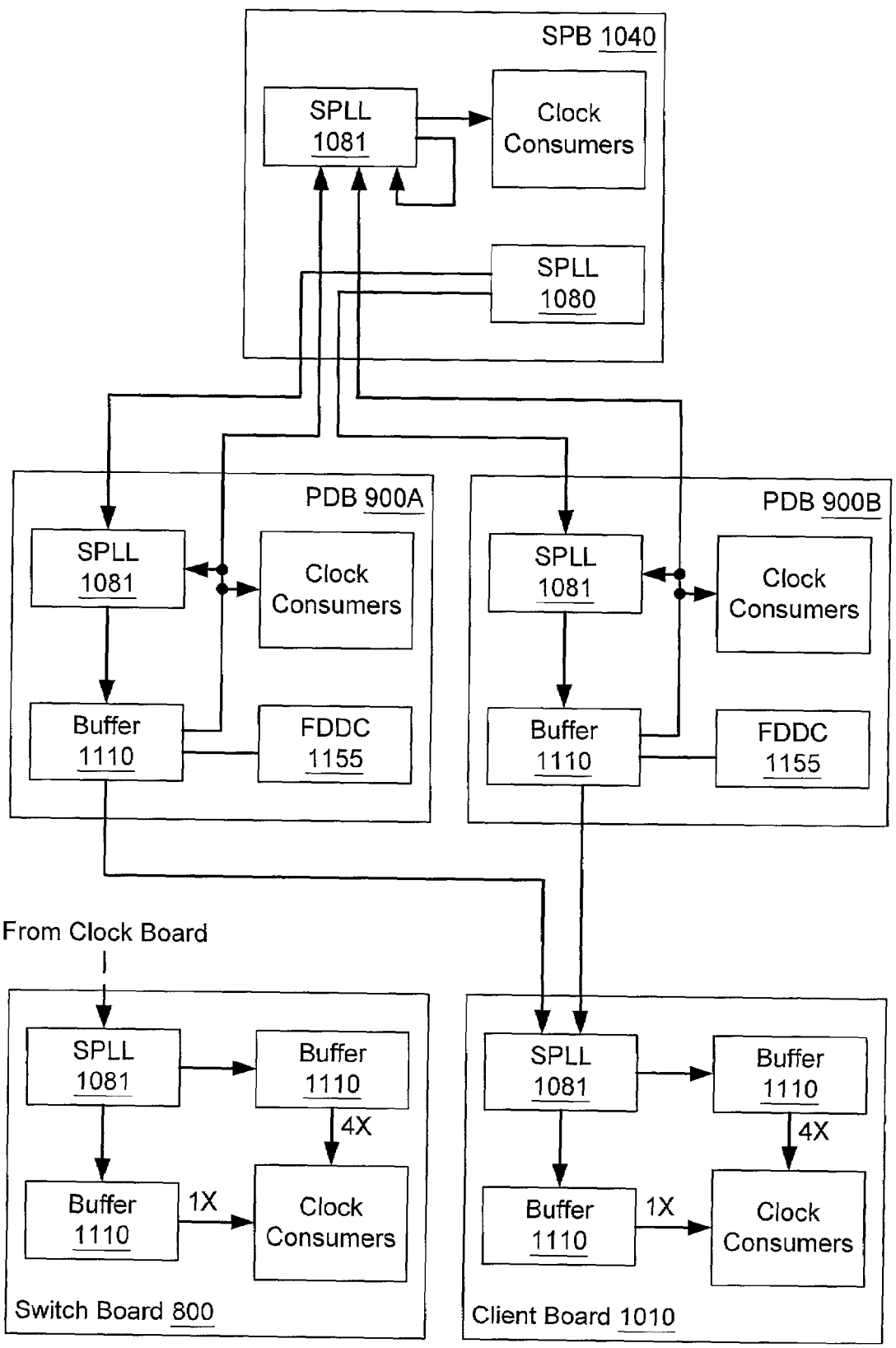
FIG. 12A is a block diagram illustrating clock distribution for one embodiment of a computer system.

FIG. 12A is a block diagram illustrating clock distribution for one embodiment of a computer system. In the embodiment shown, one SPB 1040 is present, along with power boards 900A and 900B (shown here as PDB 900A and PDB 900B). The diagram also illustrates a switch board 800 and a client board 1010, although it is understood that multiple instances of these boards may be present in various embodiments. SPB 1040 may serve as a clock board by distributing a global clock signal. The global clock signal may be distributed directly to both power boards 900A and 900B, as well as to switch board 800. Due to the physical configuration of the system (as discussed above in reference to FIGS. 10A, 10B, and 11), power boards 900 may be used to distribute the global clock signal to client board 1010.

During operation of the system shown in FIG. 12A, power board 900A may be the primary path for distributing the global clock signal (received from select PLL 1080 of SPB 1040) to client board 1010. Power board 900B may provide a backup path for distributing the global clock signal. In the event of a failure of power board 900A, or a failure of the clock circuitry on power board 900A, power board 900B may take over the distribution of the global clock signal to client board 1010.

Power boards 900A and 900B may also include frequency drift detection circuitry (FDDC) 1155. FDDC 1155 may inhibit buffer 1110 from distributing the global clock signal from its respective power board 900 if the phase difference between the clock, signal received by a power board and the global clock signal distributed by the power board exceeds a predetermined limit. If FDDC 1155 inhibits buffer 1110 from distributing the global clock signal, a second power board 900 may assume this function in embodiments having multiple power boards. Operation of FDDC 1155 will be discussed in further detail below.

Figure 12B:
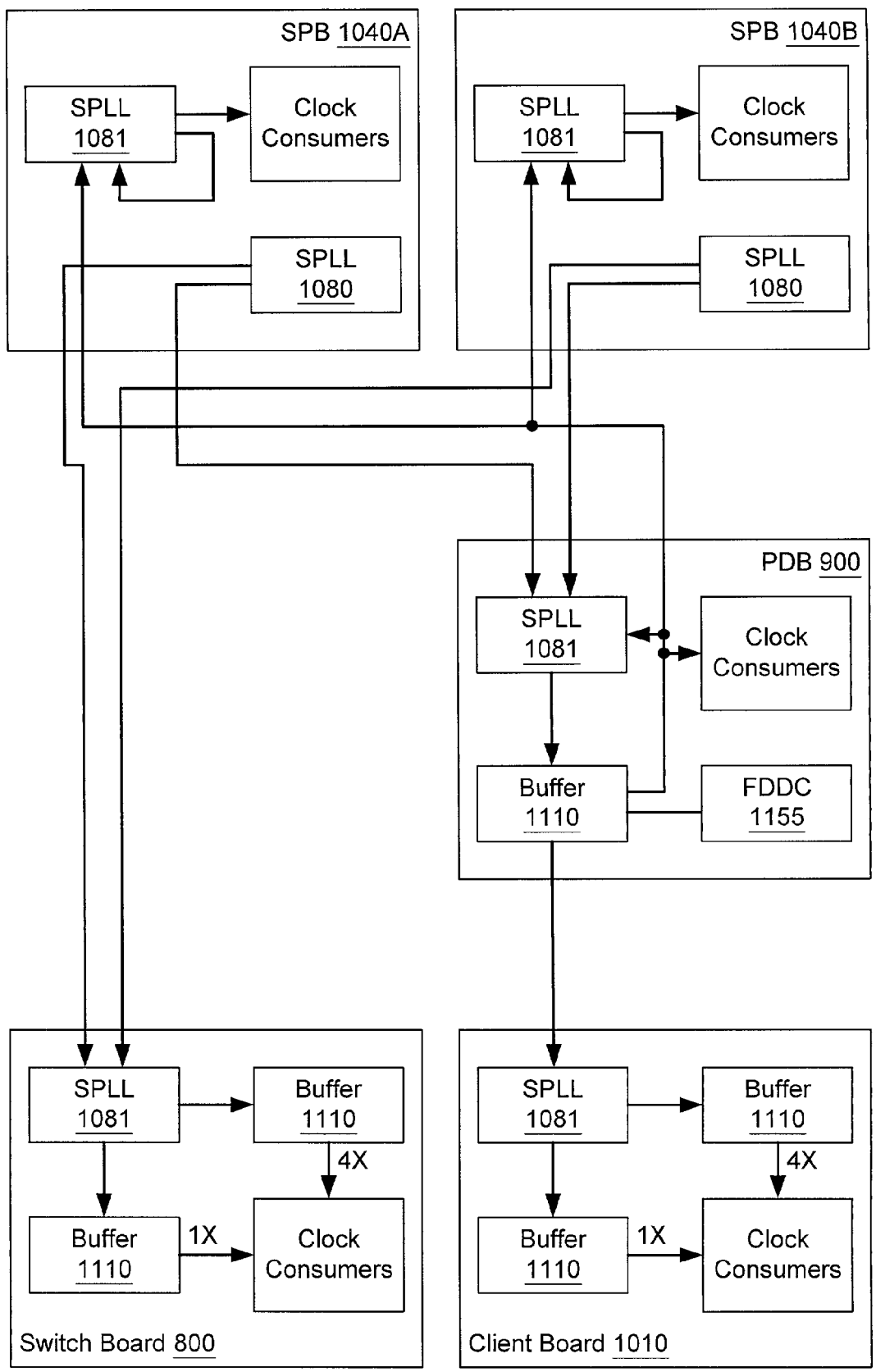
FIG. 12B is a block diagram illustrating clock distribution for another embodiment of a computer system.

FIG. 12B is a block diagram illustrating clock distribution for another embodiment of a computer system. In the embodiment shown in FIG. 12B, a single power board 900 is present along with SPB 1040A and 1040B. The presence of both SPB 1040A and 1040B may provide additional clock redundancy. SPB 1040A may provide a global clock signal to power board 900 and switch board 800. Power board 900 may be configured to detect the presence of the clock signals received from each of SPB 1040A and SPB 1040B. A failure of SPB 1040A may cause power board 900 to select the clock signal from SPB 1040B as the global clock signal. Similarly, switch board 800 may receive clock signals from both SPB 1040A and SPB 1040B, and may select the clock signal from SPB 1040B to be the global clock signal in event of a failure of SPB 1040A. Detection of the received clock signals as well as selection of the global clock signal for both power board 900 and switch board 800 may be performed by a select PLL 1081 present on each of these boards.

It should be noted that while the embodiments shown in FIG. 12A and 12B include only SPB 1040 or one power board 900, respectively, other embodiments having multiple instances of both SPB 1040 and power board 900 are possible and contemplated.

Figure 13:
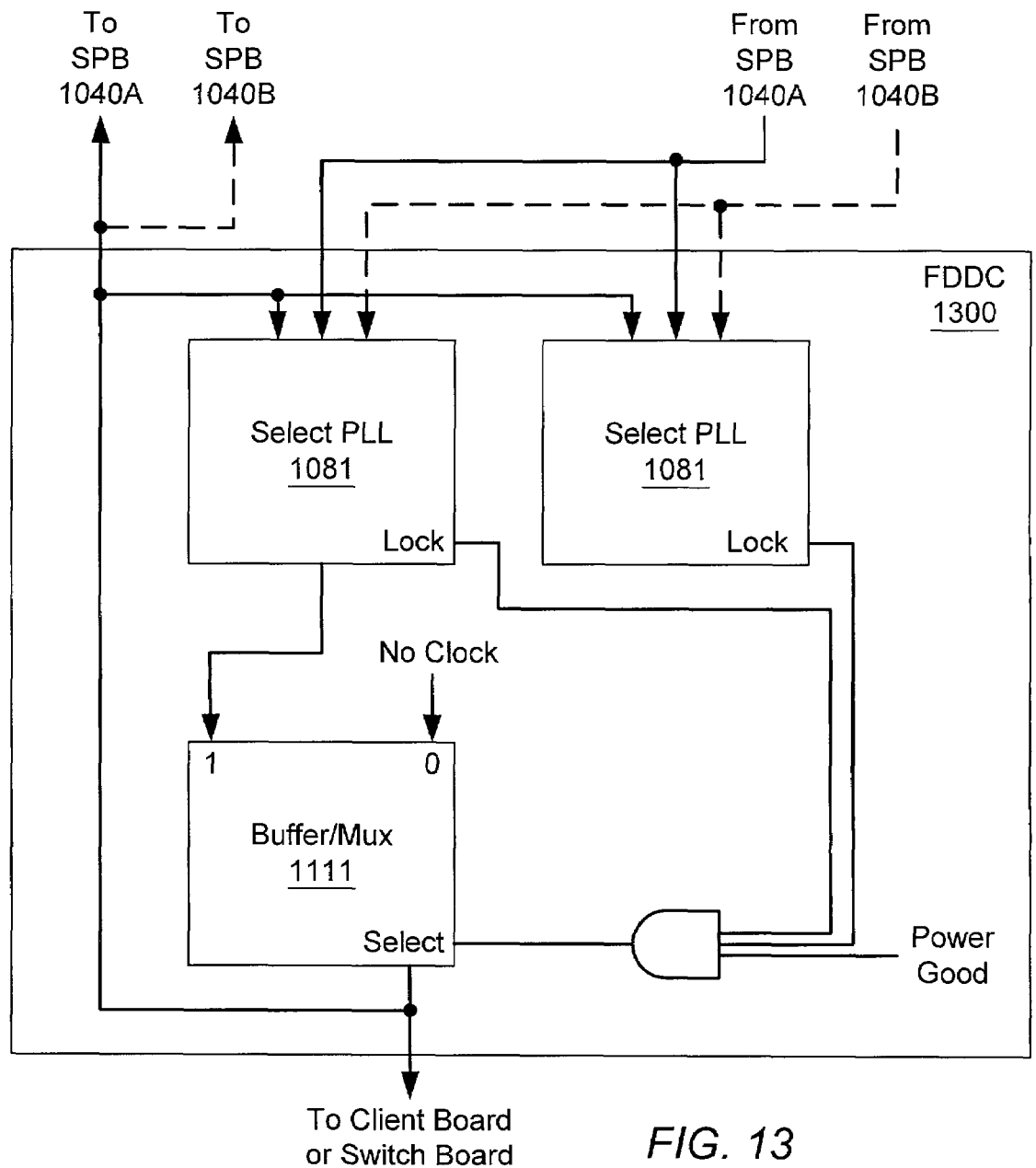
FIG. 13 is a block diagram illustrating one embodiment of a frequency drift detection circuit.

FIG. 13 is a block diagram illustrating one embodiment of a frequency drift detection circuit (FDDC). FDDC 1300 may be useful in detecting a frequency drift in a clock signal generated on an SPB 1040. In some cases, a clock signal that drifts beyond a certain frequency may be able to cause damage to other clocked circuits in the system, and thus it may be necessary to monitor for frequency drift. FDDC 1300 may be implemented on a power board 900 or an SPB 1040.

In the embodiment shown, FDDC 1300 includes two select PLLs 1081, and a buffer/multiplexer 1111. Buffer/multiplexer 1111 may include a select input, which may receive a signal from a three-input AND gate. Each select PLL 1081 may be configured to receive clock signals from SPB 1040A and SPB 1040B (in computer system embodiments having two SPB's), or may only receive a clock signal from a single SPB 1040 (in embodiments having only one SPB). In embodiments receiving clock signals from both SPB 1040A and 1040B, a first select PLL 1081 may select the clock signal which may be received by buffer/multiplexer 1111. Depending on the state of the signal at the select input, buffer/multiplexer 1111 may allow a clock signal to be distributed to client boards 1010 or fed back to an SPB 1040. If FDDC 1300 is present on an SPB 1040, the clock signal may be distributed to switch boards 800.

Both select PLLs 1081 may monitor the phase difference between the selected clock signal (which may be a feedback clock signal) and the global clock signal distributed by buffer/multiplexer 1111. Each select PLL 1081 may be configured to assert a lock signal if the phase difference is within a predetermined limit. In one embodiment, the lock signal of each select PLL 1081 may remain asserted as long as the predetermined phase difference does not exceed five degrees. The lock signals from each of the select PLLs 1081 may be propagated to the inputs of the AND gate, along with a power good signal. The power good signal may indicate that the computer system is receiving power within system operating specifications. When each of these signals is asserted, the signal at the select input of buffer/multiplexer 1111 may remain asserted, thereby allowing the receive clock signal to be distributed. If one of the lock signals or the power good signal becomes de-asserted, the output of the AND gate may follow. In this case, the 'no clock' input to buffer/multiplexer 1111 may be selected, thereby inhibiting the distribution of a global clock signal. The inhibition of the global clock signal may be detected by one or more service processor boards 1040, depending upon the system configuration. By detecting the inhibition of the global clock signal, the system may then select another clock source.

Embodiments of FDDC 1300 including only one select PLL 1081 and a two input AND gate are also possible and contemplated.

It should also be noted in reference to both power boards 900 and service boards 1040 that alternate embodiments including different types of the select PLLs (e.g. select PLL 1080 or 1081 as discussed above) are possible and contemplated. Furthermore, various embodiments of FDDC 1300 may be present on various embodiments of SPB 1040 as well as being present on embodiments of power board 900.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

What is claimed is:

1. A computer system comprising:
    a plurality of client boards;
    a plurality of switch boards;
    a clock board; and
    a plurality of power distribution boards;
    wherein the clock board includes a first plurality of detachable connectors for coupling to each of the plurality of switch boards and each of the plurality of power distribution boards, wherein the clock board is configured to generate a global clock signal, and wherein the clock board is configured to distribute the global clock signal to each of the plurality of switch boards; and
    wherein each of the power distribution boards includes a second plurality of detachable connectors for coupling to the clock board and each of the plurality of client boards, wherein each of the plurality of power distribution boards is configured to receive power from a power supply and to distribute power to each of the plurality of client boards and the clock board, and wherein each of the plurality of power distribution boards is configured to receive the global clock signal from the clock board and distribute the global clock signal to each of the plurality of client boards.

2. The computer system as recited in claim 1, wherein the plurality of power distribution boards includes a first power distribution board and a second power distribution board, wherein the first power distribution board is coupled to distribute the global clock signal to the plurality of client boards.

3. The computer system as recited in claim 2, wherein, in event of a failure of the first power distribution board, the second power distribution board is configured to distribute the global clock signal to each of the plurality of client boards.

4. The computer system as recited in claim 1, wherein, in event of a failure of the first power distribution board, the second power distribution board is configured to distribute power to the computer system.

5. The computer system as recited in claim 1, wherein each of the plurality of power distribution boards includes frequency drift detection circuitry, wherein the frequency drift detection circuitry is configured to monitor a phase difference between the global clock signal and a feedback clock signal.

6. The computer system as recited in claim 5, wherein the frequency drift detection circuitry is configured to inhibit the global clock signal responsive to detecting a predetermined phase difference between the feedback clock signal and the global clock signal.

7. The computer system as recited in claim 6, wherein the predetermined phase difference is 5 degrees.

8. The computer system as recited in claim 1, wherein the clock board includes:
a phase detector, wherein the phase detector is configured to receive a feedback clock signal;
a filter coupled to receive an output from the phase detector;
voltage controlled oscillator (VCO);
a switch, wherein the switch is selectable to coupled an output from the filter to the VCO; and
a buffer operatively coupled to an output of the VCO, wherein the buffer is configured to drive the global clock signal.

9. The computer system as recited in claim 1, wherein each of the plurality of power distribution boards includes:
a printed circuit board;
a power supply connector coupled to the printed circuit board; and
a plurality of circuit breakers, wherein each of the plurality of circuit breakers is coupled to the power supply connector by a first plurality of circuit traces, and wherein each of the plurality of circuit breakers is electrically coupled to one of the second plurality of detachable connectors by one of a second plurality of circuit traces, wherein each of the plurality of circuit breakers is configured to interrupt current flow through a corresponding one of the plurality of detachable connectors responsive to an excess current condition.

10. The computer system as recited in claim 1, wherein the clock board is configured to redundantly distribute power to each of the switch boards.

11. A computer system comprising:
a plurality of client boards;
a plurality of switch boards;
a plurality of clock boards; and
a plurality of power distribution boards;
wherein each of the plurality of clock boards includes a first plurality of detachable connectors for coupling to each of the plurality of switch boards and each of the plurality of power distribution boards, wherein the plurality of clock boards includes a first clock board and a second clock board, wherein the first clock board is configured to generate a global clock signal, and wherein the first clock board is configured to distribute the global clock signal to each of the plurality of switch boards; and
wherein the power distribution board includes a second plurality of detachable connectors for coupling to each of the plurality of client boards and each of the plurality of clock boards, wherein the power distribution board is configured to receive power from a power supply and to distribute power to each of the plurality of client boards and each of the plurality of clock boards, wherein the power distribution board is configured to receive the global clock signal from the first clock board and to distribute the global clock signal to each of the plurality of client boards.

12. The computer system as recited in claim 11, wherein, in the event of a failure of the first clock board, the second clock board is configured to distribute the global clock signal to the power distribution board and each of the plurality of switch boards.

13. The computer system as recited in claim 11, wherein the power distribution board includes frequency drift detection circuitry, wherein the frequency drift detection circuitry is configured to inhibit the global clock signal received from the first clock board responsive to detecting a predetermined phase difference between the global clock signal and a feedback clock signal.

14. The computer system as recited in claim 13, wherein the predetermined phase difference is 5 degrees.

15. The computer system as recited in claim 13, wherein the second clock board is configured to provide the global clock signal responsive to the frequency drift detection circuitry inhibiting the global clock signal received from the first clock board.

16. The computer system as recited in claim 11, wherein each of the plurality of clock distribution boards includes:
a phase detector, wherein the phase detector is configured to receive a reference clock signal and a feedback clock signal;
a filter coupled to receive an output from the phase detector;
a voltage controlled oscillator (VCO);
a switch, wherein the switch is selectable to coupled an output from the filter to the VCO; and
a buffer operatively coupled to an output of the VCO, wherein the buffer is configured to drive the global clock signal.

17. The computer system as recited in claim 16, for the first clock board, the reference clock signal is an output clock signal received from one the second clock board via the power distribution board.

18. The computer system as recited in claim 11, wherein, for the first clock board, the feedback clock signal is the global clock signal received via the power distribution board.

19. The computer system as recited in claim 11, wherein the power distribution board includes:
a printed circuit board;
a power supply connector coupled to the printed circuit board; and a plurality of circuit breakers, wherein each of the plurality of circuit breakers is coupled to the power supply connector by a first plurality of circuit traces, and wherein each of the plurality of circuit breakers is electrically coupled to one of the second plurality of detachable connectors by one of a second plurality of circuit traces, wherein each of the plurality of circuit breakers is configured to interrupt current flow through a corresponding one of the plurality of detachable connectors responsive to an excess current condition.

20. The computer system as recited in claim 11, wherein each of the plurality of clock boards is configured to redundantly distribute power to each of the plurality of switch boards.

21. A power distribution board for use in a system including a plurality of client boards and a plurality of clock boards, the power distribution board comprising:
a printed circuit board (PCB);
a plurality of detachable connectors for coupling to each of the plurality of client boards and each of the plurality of clock boards;
a first plurality of circuit traces for distributing power to the plurality of client boards and the plurality of clock boards, wherein each of the plurality of circuit traces is coupled to a power supply connector configured for coupling to a power supply; and
clock distribution circuitry, wherein the clock distribution circuitry is configured to receive a global clock signal from a first clock board of the plurality of clock boards, and wherein the clock distribution circuitry is configured to distribute the global clock signal to each of the plurality of client boards.

22. The power distribution board as recited in claim 21, wherein the clock distribution circuitry includes:
a first select PLL (phase locked loop), wherein the first select PLL is coupled to receive the global clock signal from the first clock board; and
a buffer, wherein the buffer is configured to receive the global clock signal from the first select PLL and to distribute the global clock signal to the plurality of client boards through the detachable connectors.

23. The power distribution board as recited in claim 22, wherein the buffer is further configured to distribute a feedback clock signal to the first clock board.

24. The power distribution board as recited in claim 22, wherein the buffer is further configured to distribute a reference clock signal to a second clock board of the plurality of clock boards.

25. The power distribution board as recited in claim 24, wherein the power distribution board includes a frequency drift detection circuit (FDDC), the FDDC configured to detect a frequency drift in the global clock signal.

26. The power distribution board as recited in claim 25, wherein the frequency drift is determined by detecting a predetermined phase shift in the global clock signal.

27. The power distribution board as recited in claim 26, wherein the predetermined phase shift is 5 degrees.

28. The power distribution board as recited in claim 24, in event of a failure of the first clock board, the global clock signal is received from the second clock board.

29. The power distribution board as recited in claim 21 further comprising a plurality of detachable connectors for coupling to the plurality of client boards and the plurality of clock boards, the plurality of detachable connectors mounted on the PCB.

30. The power distribution board as recited in claim 29 further comprising a plurality of circuit breakers, each of the plurality of circuit breakers configured to interrupt current flow to a corresponding one of the plurality of detachable connectors responsive to an excess current condition, wherein each of the plurality of circuit breakers is coupled to the corresponding one of the plurality of detachable connectors by one of a second plurality of circuit traces.

* * * * *